United States Patent
Larsson et al.

(10) Patent No.: US 11,012,200 B2
(45) Date of Patent: *May 18, 2021

(54) NODE AND METHOD FOR UPLINK SCHEDULING AND HYBRID AUTOMATIC REPEAT REQUEST TIMING

(71) Applicant: Telefonaktiebolaget LM Ericsson (Publ), Stockholm (SE)

(72) Inventors: Daniel Larsson, Vallentuna (SE); Jung-Fu Cheng, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,409

(22) Filed: Nov. 8, 2016

(65) Prior Publication Data
US 2017/0054532 A1    Feb. 23, 2017

Related U.S. Application Data

(63) Continuation of application No. 14/239,470, filed as application No. PCT/SE2013/051208 on Oct. 16, 2013, now Pat. No. 9,510,361.
(Continued)

(51) Int. Cl.
*H04L 1/18* (2006.01)
*H04L 5/00* (2006.01)
(Continued)

(52) U.S. Cl.
CPC ......... *H04L 1/1861* (2013.01); *H04B 7/2615* (2013.01); *H04L 1/1812* (2013.01);
(Continued)

(58) Field of Classification Search
CPC ............... H04L 1/1861; H04L 11/1812; H04L 15/0055; H04L 15/14; H04B 7/2615; H04W 72/0446; H04W 172/1263
See application file for complete search history.

(56) References Cited

U.S. PATENT DOCUMENTS

2012/0257554 A1* 10/2012 Kim ................. H04L 5/001
370/280
2013/0163485 A1* 6/2013 Wan ................. H04W 72/0426
370/280
(Continued)

FOREIGN PATENT DOCUMENTS

CN     103209061 A   7/2013
WO   2013025143 A1   2/2013
(Continued)

OTHER PUBLICATIONS

International Search Report and Written Opinion dated Apr. 16, 2014 for International Application Serial No. PCT/SE2013/051208, International Filing Date: Oct. 16, 2013 consisting of 9-pages.
(Continued)

*Primary Examiner* — Ronald B Abelson
(74) *Attorney, Agent, or Firm* — Christopher & Weisberg, P.A.

(57) ABSTRACT

Example embodiments presented herein are directed towards a base station, and corresponding method therein, for determining a control timing configuration. The control timing configuration provides a subframe timing for configuring PUSCH and uplink HARQ-ACK control timing for a cell serving a user equipment in a multiple cell communications network. The user equipment is served by a TDD based cell and a FDD based cell. Example embodiments are also directed towards a user equipment, and corresponding method therein, determining the control timing configuration discussed above.

4 Claims, 19 Drawing Sheets

Related U.S. Application Data

(60) Provisional application No. 61/869,086, filed on Aug. 23, 2013.

(51) Int. Cl.
| | |
|---|---|
| *H04L 5/14* | (2006.01) |
| *H04B 7/26* | (2006.01) |
| *H04W 72/12* | (2009.01) |
| *H04W 72/04* | (2009.01) |
| *H04W 84/04* | (2009.01) |
| *H04W 88/08* | (2009.01) |

(52) U.S. Cl.
CPC .............. *H04L 5/0055* (2013.01); *H04L 5/14* (2013.01); *H04W 72/0446* (2013.01); *H04W 72/1263* (2013.01); *H04W 84/042* (2013.01); *H04W 88/08* (2013.01)

(56) References Cited

U.S. PATENT DOCUMENTS

| | | | |
|---|---|---|---|
| 2013/0188532 A1 | 7/2013 | Zhang et al. | |
| 2013/0336267 A1 | 12/2013 | Li et al. | |
| 2014/0022960 A1* | 1/2014 | Fu .................. | H04W 24/02 370/280 |
| 2014/0029484 A1* | 1/2014 | Choi ................ | H04J 3/1694 370/280 |
| 2014/0112219 A1 | 4/2014 | Li et al. | |
| 2014/0211671 A1* | 7/2014 | Choi ................ | H04J 3/1694 |
| 2014/0293893 A1* | 10/2014 | Papasakellariou .... | H04W 72/04 |
| 2015/0085711 A1 | 3/2015 | Wang et al. | |

FOREIGN PATENT DOCUMENTS

| | | |
|---|---|---|
| WO | 2013113272 A1 | 8/2013 |
| WO | 2014017854 A1 | 1/2014 |

OTHER PUBLICATIONS

3GPP TSG RAN WG1, Meeting #66, R1-112408, Title: "CC-specific TDD configuration for enhanced CA in Rel-11," Agenda Item: 6.2.2.3, Source: Alcatel-Lucent et al; Alcatel-Lucent Shanghai Bell, Document for Discussion, Conference Location and Date: Athens, Greece, Aug. 18, 2011 consisting of 4-pages.

3GPP TS 36.211 V11.1.0 (Dec. 2012) 3rd Generation Partnership Project; Technical Specification Group Radio Access Network; Evolved Universal Terrestrial Radio Access (E-UTRA); Physical Channels and Modulation (Release 11) Dec. 20, 2012 consisting of 108-pages.

3GPP TSG RAN WG1 Meeting #74, R1-133372, Title: "CA-Based Aspects for FDD-TDD Joint Operation," Agenda Item: 7.2.5, Source: LG Electronics, Document for: Discussion, Conference Location and Date: Barcelona, Spain, Aug. 19-23, 2013 consisting of 3-pages.

3GPP TSG RAN WG1 Meeting #74, R1-133780, Title: "On Solutions for FDD-TDD Joint Operation", Agenda Item: 7.2.5.2, Source: BlackBerry UK Limited, Document for: Discussion, Conference Location and Date: Barcelona, Spain, Aug. 19-23, 2013, consisting of 7-pages.

Indian Examination Report and English Translation dated Nov. 27, 2018 for Application No. 3316/KOLNP/2015 filed on Oct. 9, 2015, consisting of 5-pages.

Extended European Search Report dated Oct. 19, 2019 for Application No. 19189125.8; consisting of 9-pages.

* cited by examiner

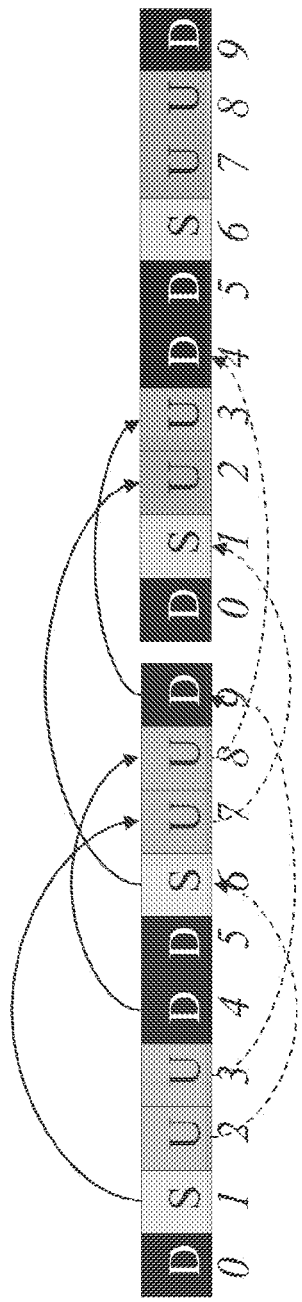
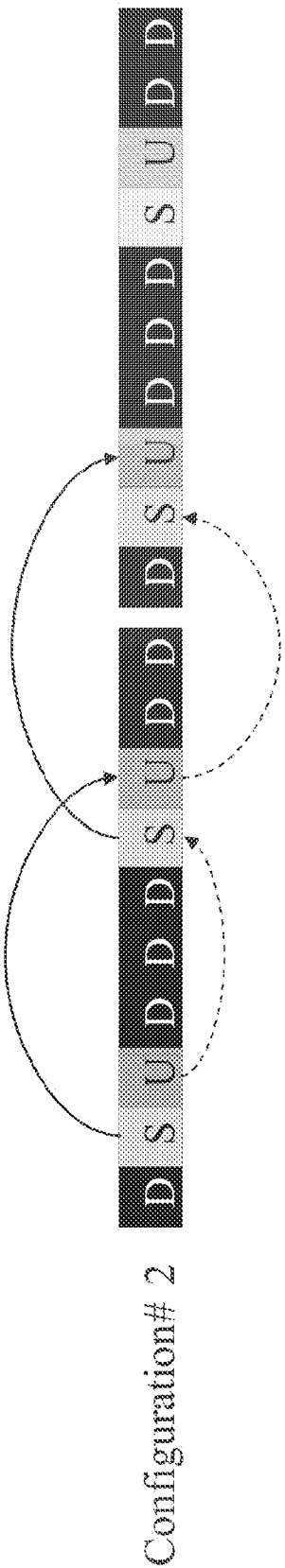
FIGURE 4A
FIGURE 4B

NODE AND METHOD FOR UPLINK SCHEDULING AND HYBRID AUTOMATIC REPEAT REQUEST TIMING

CROSS-REFERENCE TO RELATED APPLICATION

This application is a continuation of U.S. National Stage patent application Ser. No. 14/239,470, filed Feb. 18, 2014, entitled "NODE AND METHOD FOR DOWNLINK SCHEDULING AND HYBRID AUTOMATIC REPEAT REQUEST TIMING," which claims priority to International Application Serial No. PCT/SE2013/051208, International filing date Oct. 16, 2013, which claims the benefit of U.S. Provisional Application Ser. No. 61/869,086, filed Aug. 23, 2013, the entirety of each of which is incorporated herein by reference.

TECHNICAL FIELD

Example embodiments presented herein are directed towards a base station and user equipment, and corresponding methods therein, for determining a one control timing configuration. The control timing configuration provides a subframe timing setting for configuring Physical Uplink Shared Channel (PUSCH) and uplink Hybrid Automatic Repeat Request Acknowledgment (HARQ-ACK) control timing for a cell serving the user equipment in a multiple cell communications network. The user equipment is served by a Time Division Duplex (TDD) based cell and a Frequency Division Duplex (FDD) based cell.

BACKGROUND

Long Term Evolution Systems

Long Term Evolution (LTE) uses Orthogonal Frequency Division Multiplexing (OFDM) in the downlink direction and a Discrete Fourier Transform (DFT)-spread OFDM in the uplink direction. The basic LTE downlink physical resource can thus be seen as a time-frequency grid, where each resource element corresponds to one OFDM subcarrier during one OFDM symbol interval. In the time domain, LTE downlink transmissions may be organized into radio frames of 10 ms, with each radio frame consisting of ten equally-sized subframes of length Tsubframe=1 ms.

Furthermore, the resource allocation in LTE is typically described in terms of resource blocks, where a resource block corresponds to one slot, e.g., 0.5 ms, in the time domain and 12 subcarriers in the frequency domain. A pair of two adjacent resource blocks in time direction, e.g., 1.0 ms, is known as a resource block pair. Resource blocks are numbered in the frequency domain, starting with 0 from one end of the system bandwidth.

The notion of virtual resource blocks (VRB) and physical resource blocks (PRB) has been introduced in LTE. The actual resource allocation to a user equipment is made in terms of VRB pairs. There are two types of resource allocations, localized and distributed. In the localized resource allocation, a VRB pair is directly mapped to a PRB pair, hence two consecutive and localized VRBs are also placed as consecutive PRBs in the frequency domain. On the other hand, the distributed VRBs are not mapped to consecutive PRBs in the frequency domain, thereby providing frequency diversity for data channel transmitted using these distributed VRBs.

Downlink transmissions are dynamically scheduled, i.e., in each subframe the base station transmits control information regarding which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of, e.g., the control information.

From LTE Release 11 and onwards, the above described resource assignments may also be scheduled on the enhanced Physical Downlink Control Channel (EPDCCH). For 3GPP Release 8 to 3GPP Release 10, only Physical Downlink Control Channel (PDCCH) is available.

PDCCH Search Space

LTE defines so-called search spaces, which describe the set of CCEs the terminal is supposed to monitor for scheduling assignments/grants relating to a certain component carrier. A search space is a set of candidate control channels formed by CCEs on a given aggregation level, which the terminal is supposed to attempt to decode. As there are multiple aggregation levels, corresponding to one, two, four, and eight CCEs, a terminal has multiple search spaces. In each subframe, the terminals will attempt to decode all the PDCCHs that can be formed from the CCEs in each of its search spaces. If the CRC checks, the content of the control channel is declared as valid for this terminal and the terminal processes the information (scheduling assignment, scheduling grants, etc.). Each terminal in the system therefore has a terminal-specific search space at each aggregation level.

In several situations, there is a need to address a group of, or all, terminals in the system. To allow all terminals to be addressed at the same time, LTE has defined common search spaces in addition to the terminal-specific search spaces. A common search space is, as the name implies, common, and all terminals in the cell monitor the CCEs in the common search spaces for control information. Although the motivation for the common search space is primarily transmission of various system messages, it may be used to schedule individual terminals as well. Thus, it may be used to resolve situations where scheduling of one terminal is blocked due to lack of available resources in the terminal-specific search space. More important, the common search space is not dependent of user equipment configuration status. Therefore, the common search space may be used when the NW needs communicate with the user equipment during user equipment reconfiguration periods.

PUCCH

If the mobile terminal has not been assigned an uplink resource for data transmission, the L1/L2 control information, e.g., channel-status reports, Hybrid-ARQ acknowledgments, and scheduling requests, is transmitted in uplink resources, e.g., resource blocks, specifically assigned for uplink L1/L2 control on 3GPP Release 8 PUCCH. These resources are located at the edges of the total available cell bandwidth. Each such resource consists of 12 "subcarriers", e.g., one resource block, within each of the two slots of an uplink subframe. In order to provide frequency diversity, these frequency resources are frequency hopping on the slot boundary, i.e., one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g., in case of very large overall transmission bandwidth supporting a large number of users, additional resources blocks can be assigned next to the previously assigned resource blocks.

Carrier Aggregation

The LTE Release 10 standard has recently been standardized, supporting bandwidths larger than 20 MHz. One important requirement on LTE Release 10 is to assure backward compatibility with LTE Release 8. This should also include spectrum compatibility. That would imply that an LTE Release 10 carrier, wider than 20 MHz, should appear as a number of LTE carriers to an LTE Release 8 terminal. Each such carrier may be referred to as a Component Carrier (CC). In particular for early LTE Release 10 deployments it may be expected that there will be a smaller number of LTE Release 10 capable terminals compared to many LTE legacy terminals. Therefore, it is necessary to assure an efficient use of a wide carrier also for legacy terminals, i.e., that it is possible to implement carriers where legacy terminals may be scheduled in all parts of the wideband LTE Release 10 carrier. The straightforward way to obtain this would be by means of Carrier Aggregation (CA). CA implies that an LTE Release 10 terminal may receive multiple CC, where the CC have, or at least the possibility to have, the same structure as a Release 8 carrier.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

During initial access a LTE Release 10 terminal behaves similar to a LTE Release 8 terminal. Upon successful connection to the network a terminal may, depending on its own capabilities and the network, be configured with additional CCs in the UL and DL. Configuration is based on RRC. Due to the heavy signaling and rather slow speed of RRC signaling, it is envisioned that a terminal may be configured with multiple CCs even though not all of them are currently used. If a terminal is configured on multiple CCs this would imply it has to monitor all DL CCs for PDCCH and PDSCH. This implies a wider receiver bandwidth, higher sampling rates, etc., resulting in high power consumption.

To mitigate the above problems, LTE Release 10 supports activation of CCs on top of configuration. The terminal monitors only configured and activated CCs for PDCCH and PDSCH. Since activation is based on Medium Access Control (MAC) control elements, which are faster than RRC signaling, activation/de-activation may follow the number of CCs that are required to fulfill the current data rate needs. Upon arrival of large data amounts multiple CCs are activated, used for data transmission, and de-activated if not needed anymore. All but one CC, the DL Primary CC (DL PCC), may be de-activated. Activation provides therefore the possibility to configure multiple CC but only activate them on a need basis. Most of the time a terminal would have one or very few CCs activated resulting in a lower reception bandwidth and thus battery consumption.

Scheduling of a CC is done on the PDCCH via downlink assignments. Control information on the PDCCH is formatted as a Downlink Control Information (DCI) message. In Release 8 a terminal only operates with one DL and one UL CC, the association between DL assignment, UL grants and the corresponding DL and UL CCs is therefore clear. In LTE Release 10 two modes of CA needs to be distinguished. The first case is very similar to the operation of multiple Release 8 terminals, a DL assignment or UL grant contained in a DCI message transmitted on a CC is either valid for the DL CC itself or for associated (either via cell-specific or UE specific linking) UL CC. A second mode of operation augments a DCI message with the Carrier Indicator Field (CIF). A DCI containing a DL assignment with CIF is valid for that DL CC indicted with CIF and a DCI containing an UL grant with CIF is valid for the indicated UL CC.

DCI messages for downlink assignments contain among others resource block assignment, modulation and coding scheme related parameters, HARQ redundancy version, etc. In addition to those parameters that relate to the actual downlink transmission most DCI formats for downlink assignments also contain a bit field for Transmit Power Control (TPC) commands. These TPC commands are used to control the uplink power control behavior of the corresponding PUCCH that is used to transmit the HARQ feedback.

In LTE Release 10, the transmission of PUCCH is mapped onto one specific uplink CC, the UL Primary CC (UL PCC). Terminals only configured with a single DL CC, which is then the DL PCC, and UL CC, which is then the UL PCC, are operating dynamic ACK/NACK on PUCCH according to 3GPP Release 8. The first Control Channel Element (CCE) used to transmit PDCCH for the DL assignment determines the dynamic ACK/NACK resource on 3GPP Release 8 PUCCH. Since only one DL CC is cell-specifically linked with the UL PCC no PUCCH collisions may occur since all PDCCH are transmitted using different first CCE.

Upon reception of DL assignments on a single Secondary CC (SCC) or reception of multiple DL assignments, a PUCCH format (which is referred to as CA PUCCH herein) that can carry the HARQ-ACK of multiple serving cells should be used. A DL SCC assignment alone is untypical. The eNB scheduler should strive to schedule a single DL CC assignment on the DL PCC and try to de-activate SCCs if not needed. A possible scenario that may occur is that eNB schedules terminal on multiple DL CCs including the PCC. If the terminal misses all but the DL PCC assignment it will use Release 8 PUCCH instead of CA PUCCH. To detect this error case eNB has to monitor both the Release 8 PUCCH and the CA PUCCH.

In LTE Release 10, the CA PUCCH format is based on the number of configured CC. Configuration of CC is based on RRC signaling. After successful reception/application of the new configuration a confirmation message is sent back making RRC signaling very safe.

CA PUCCH Transmission Scheme

In this application, CA PUCCH refers to means of transmitting HARQ-ACK of multiple serving cells in the UL. For Rel-10 LTE, CA PUCCH can be embodied in one of the following two approaches. The first method is based on the use of PUCCH format 3 that is based on DFTS-OFDM. The multiple ACK/NACK bits are encoded to form 48 coded bits. The coded bits are then scrambled with cell-specific (and possibly DFTS-OFDM symbol dependent) sequences. 24 bits are transmitted within the first slot and the other 24 bits are transmitted within the second slot. The 24 bits per slot are converted into 12 QPSK symbols, DFT precoded, spread across five DFTS-OFDM symbols and transmitted within one resource blocks (bandwidth) and five DFTS-OFDM symbols (time). The spreading sequence is user equipment specific and enables multiplexing of up to five users within the same resource blocks. For the reference signals cyclic shifted CAZAC sequences, e.g., computer optimized sequences, may be used.

The second CA PUCCH method is called channel selection. The basic principle is that the user equipment is assigned a set of PUCCH format 1a/1b resources. The user equipment then selects one of resources according to the ACK/NACK sequence the user equipment should transmit. On one of the assigned resources, the user equipment would then transmit a QPSK or BPSK. The eNB detects which resource the user equipment used and which QPSK or BPSK value the user equipment fed back on the used resource and combines this into a HARQ response for associated DL cells. A similar type of mapping including a bundling approach is also done for TDD as in the FDD, in case the user equipment is configured with channel selection.

Time Division Duplex

Transmission and reception from a node, e.g., a terminal or user equipment 501 and base station 401 in a cellular system such as LTE, may be multiplexed in the frequency domain or in the time domain (or combinations thereof). Frequency Division Duplex (FDD) as illustrated to the left in FIG. 1 implies that downlink and uplink transmission take place in different, sufficiently separated, frequency bands. Time Division Duplex (TDD), as illustrated to the right in FIG. 1, implies that downlink and uplink transmission take place in different, non-overlapping time slots. Thus, TDD can operate in unpaired spectrum, whereas FDD requires paired spectrum.

Typically, the structure of the transmitted signal in a communication system is organized in the form of a frame structure. For example, LTE uses ten equally-sized subframes of length 1 ms per radio frame as illustrated in FIG. 2.

In case of FDD operation, illustrated in the upper section of FIG. 2, there are two carrier frequencies, one for uplink transmission ($f_{UL}$) and one for downlink transmission ($f_{DL}$). At least with respect to the terminal in a cellular communication system, FDD may be either full duplex or half duplex. In the full duplex case, a terminal may transmit and receive simultaneously, while in half-duplex operation, the terminal may not transmit and receive simultaneously. The base station is capable of simultaneous reception/transmission though, e.g., receiving from one terminal while simultaneously transmitting to another terminal. In LTE, a half-duplex terminal is monitoring/receiving in the downlink except when explicitly being instructed to transmit in a certain subframe.

In case of TDD operation, illustrated in the lower section of FIG. 2, there is only a single carrier frequency and uplink and downlink transmissions are always separated in time also on a cell basis. As the same carrier frequency is used for uplink and downlink transmission, both the base station and the mobile terminals need to switch from transmission to reception and vice versa. An essential aspect of any TDD system is to provide the possibility for a sufficiently large guard time where neither downlink nor uplink transmissions occur. This is required to avoid interference between uplink and downlink transmissions. For LTE, this guard time is provided by special subframes, e.g., subframe 1 and, in some cases, subframe 6, which are split into three parts: a downlink part (DwPTS), a guard period (GP), and an uplink part (UpPTS). The remaining subframes are either allocated to uplink or downlink transmission.

TDD allows for different asymmetries in terms of the amount of resources allocated for uplink and downlink transmission, respectively, by means of different downlink/uplink configurations. In LTE, there are seven different configurations as shown in FIG. 3. It should be appreciated that a DL subframe may mean either DL or the special subframe.

To avoid severe interference between downlink and uplink transmissions between different cells, neighbor cells should have the same downlink/uplink configuration. If this is not done, uplink transmission in one cell may interfere with downlink transmission in the neighboring cell and vice versa. Hence, the downlink/uplink asymmetry may typically not vary between cells, but is signaled as part of the system information and remains fixed for a long period of time.

PUSCH Scheduling and PHICH Timings

The PUSCH scheduling timing and the corresponding HARQ feedback PHICH timing are described extensively in 3GPP Technical Specification 36.213. A basic summary is provided below for discussing the example embodiments presented herein.

For TDD UL/DL configurations 1-6 and normal HARQ operation, the user equipment shall upon detection of a PDCCH/ePDCCH with uplink DCI format and/or a PHICH transmission in subframe n intended for the user equipment, adjust the corresponding PUSCH transmission in subframe n+k, with k given in Table 8-2 of TS 36.213 (reproduced in Table 1 below), according to the PDCCH/ePDCCH and PHICH information. For FDD, k=4.

TABLE 1

| k for TDD configurations 0-6 | | | | | | | | | | |
|---|---|---|---|---|---|---|---|---|---|---|
| TDD UL/DL | subframe number n | | | | | | | | | |
| Configuration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

For TDD UL/DL configuration 1-6, if a user equipment is configured with one serving cell, or if the user equipment is configured with more than one serving cell and the TDD UL/DL configuration of all the configured serving cells is the same, an HARQ-ACK received on the PHICH assigned to a user equipment in subframe i is associated with the PUSCH transmission in the subframe i-k as indicated by the following Table 8.3-1 of TS 36.213 (reproduced below). For FDD, k=4.

TABLE 2

| k for TDD configurations 0-6 | | | | | | | | | | |
|---|---|---|---|---|---|---|---|---|---|---|
| TDD UL/DL | subframe number i | | | | | | | | | |
| Configuration | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | | 6 | 4 | | | 7 | 4 | | | 6 |

For TDD, if the user equipment is configured with one serving cell, or if the user equipment is configured with more than one serving cell and the TDD UL/DL configuration of all the configured serving cells is the same, for PUSCH transmissions scheduled from serving cell c in subframe n, the user equipment shall determine the corresponding PHICH resource of serving cell c in subframe n+$k_{PHICH}$, where $k_{PHICH}$ is given in Table 9.1.2-1 of TS 36.213 (reproduced in Table 3 below). For FDD, $k_{PHICH}=4$.

TABLE 3

$k_{PHICH}$ for TDD

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Within the downlink control information (DCI) transmitted to the user equipment via PDCCH/ePDCCH for scheduling PUSCH, there is a transmit power control (TPC) command. For a PUSCH transmission at subframe i, the TPC command from subframe i−$K_{PUSCH}$ should be incorporated. For TDD UL/DL configurations 1-6, $K_{PUSCH}$ is given in Table 5.1.1.1-1 of TS 36.213 (reproduced in Table 4 below). For FDD, $K_{PUSCH}=4$.

TABLE 4

$K_{PUSCH}$ for TDD

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

SUMMARY

In current 3GPP standards, the possibility of a user equipment being served by an aggregated FDD and TDD carrier simultaneously is not discussed or addressed. Thus, at least one example object of the example embodiments presented herein is to provide mechanisms to implement control timing configurations for establishing PUSCH and Physical HARQ-ACK control timing for a cell serving a user equipment in a FDD and TDD carrier aggregated network. The example embodiments presented herein have the example advantage of providing a simple scheme to derive the subframes for the timing of HARQ and the scheduling for TDD and FDD aggregation.

Accordingly, some of the example embodiments are directed towards a method, in a base station, for determining a control timing configuration. The control timing configuration provides a subframe timing setting for configuring PUSCH and uplink HARQ-ACK control timing for a cell serving a user equipment in a multiple cell communications network. The user equipment is served by a TDD based cell and a FDD based cell. The method comprises determining a control timing configuration for a secondary cell. The secondary cell is one of the TDD based cell or the FDD based cell. The determining is based on a type of a scheduling cell. The type of the scheduling cell is one of the FDD based cell or the TDD based cell. The method further comprises implementing the at least one control timing configuration for PUSCH and uplink HARQ-ACK control timing for a cell serving the user equipment.

Some of the example embodiments are directed towards a base station for determining a control timing configuration. The control timing configuration provides a subframe timing setting for configuring PUSCH and uplink HARQ-ACK control timing for a cell serving a user equipment in a multiple cell communications network. The user equipment is served by a TDD based cell and a FDD based cell. The base station comprises processing circuitry configured to determine a control timing configuration for a secondary cell. The secondary cell being one of the TDD based cell or the FDD based cell. The processing circuitry is configured to determine the control timing configuration based on a type of the scheduling cell. The type of the scheduling cell is one of the FDD based cell or the TDD based cell. The processing circuitry is further configured to implement the control timing configuration for PUSCH and uplink HARQ-ACK control timing for a cell serving the user equipment.

Some of the example embodiments are directed towards a method, in a user equipment, for determining a control timing configuration. The control timing configuration provides a subframe timing setting for configuring PUSCH and uplink HARQ-ACK control timing for a cell serving the user equipment in a multiple cell communications network. The user equipment is served by a TDD based cell and a FDD based cell. The method comprises determining a control timing configuration for a secondary cell. The secondary cell is one of the TDD based cell or the FDD based cell. The determining is based on a type of a scheduling cell. The type of the scheduling cell is one of the FDD based cell or the TDD based cell. The method further comprises implementing the control timing configuration for PUSCH and uplink HARQ-ACK control timing for a cell serving the user equipment.

Some of the example embodiments are directed towards a user equipment for determining a control timing configuration. The control timing configuration provides a subframe timing setting for configuring PUSCH and uplink HARQ-ACK control timing for a cell serving the user equipment in a multiple cell communications network. The user equipment is served by a TDD based cell and a FDD based cell. The user equipment comprises processing circuitry configured to determine a control timing configuration for a secondary cell. The secondary cell is one of the TDD based cell or the FDD based cell. The processing circuitry is configured to determine the control timing configuration based on a type of at least one scheduling cell. The type of the scheduling cell being one of the FDD based cell or the TDD based cell. The processing circuitry is further configured to implement the at least one control timing configuration for PUSCH and uplink HARQ-ACK control timing for a cell serving the user equipment.

Definitions

ACK Acknowledgement
AL Aggregation Level
ARQ Automatic Repeat reQuest
BPSK Binary Phase Shift Keying C-RNTI Cell Radio Network Temporary Identifier
CA Carrier Aggregation
CAZAC Constant Amplitude Zero Autocorrelation
CC Component Carrier
CCE Control-Channel Elements
CFI Control Format Indicator
CIF Carrier Indicator Field
CRC Cyclic Redundancy Check
DCI Downlink Control Information
DFT Discrete Fourier Transform
DFTS DFT Spread
DL Downlink
DTX Discontinuous Transmission
DwPTS Downlink Part of a Special Subframe
ePDCCH enhanced Physical Downlink Control Channel
E-UTRA Evolved Universal Terrestrial Radio Access
GP Guard Period
FDD Frequency Division Duplexing
HARQ Hybrid Automatic Repeat Request
LSB Least Significant Bit
LTE Long Term Evolution
MAC Medium Access Control
NACK Non-Acknowledgement
NW Network
OFDM Orthogonal Frequency Division Multiplexing
PCell Primary Cell
PCC Primary CC
PDCCH Physical Downlink Control Channel
PDSCH Physical Downlink Shared Channel
PHICH Physical Hybrid ARQ Indicator Channel
PRB Physical Resource Blocks
PUCCH Physical Uplink Control Channel
PUSCH Physical Uplink Shared Channel
QPSK Quadrature Phase Shift Keying
REG Resource Element Group
RNTI Radio Network Temporary Identifier
RRC Radio Resource Control
SCell Secondary Cell
SCC Secondary CC
TDD Time Division Duplexing
TPC Transmit Power Control
UE User Equipment
UL Uplink
UpPTS Uplink Part of a Special Subframe
VRB Virtual Resource Blocks

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIGS. 4A and 4B illustrate an example of PUSCH scheduling and feedback timing for a configuration 1 and configuration 2 cell, respectively, without the use of cross carrier scheduling;

DETAILED DESCRIPTION

Figure 1:
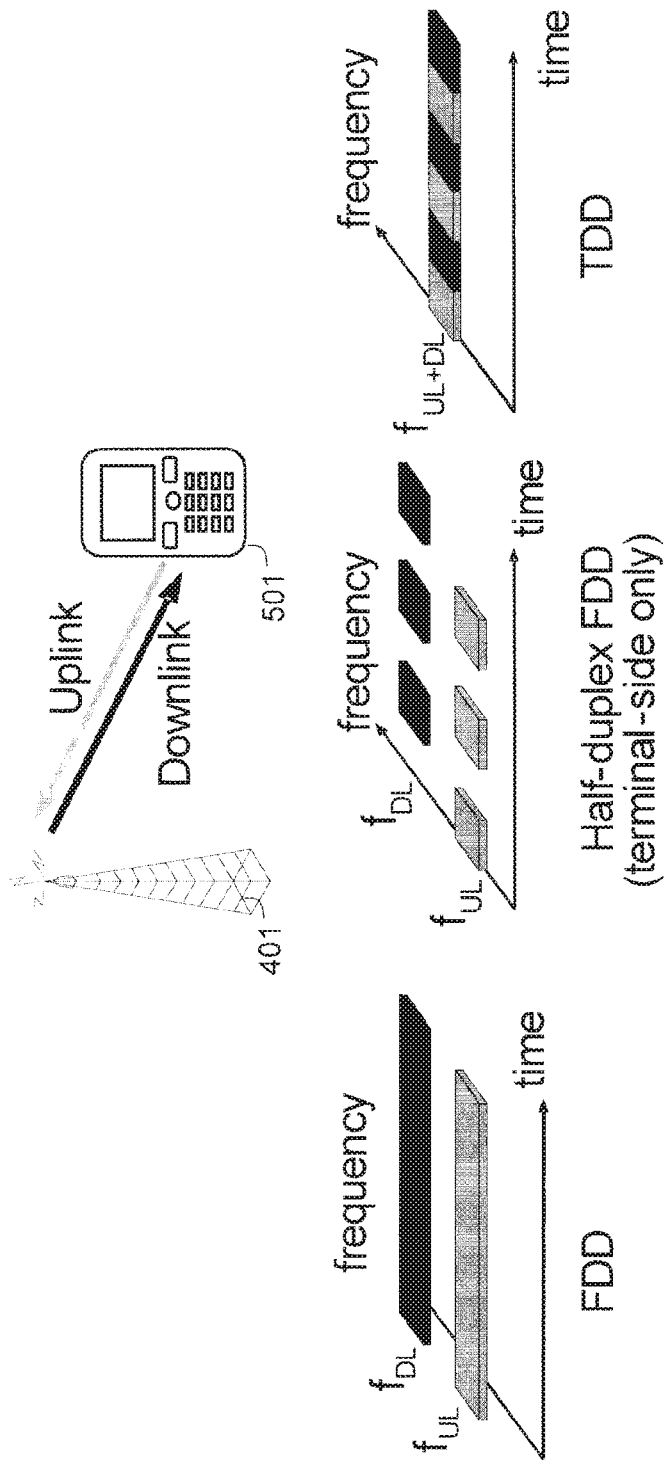
FIG. 1 is an illustrative example of frequency and time division duplex.
Figure 2:
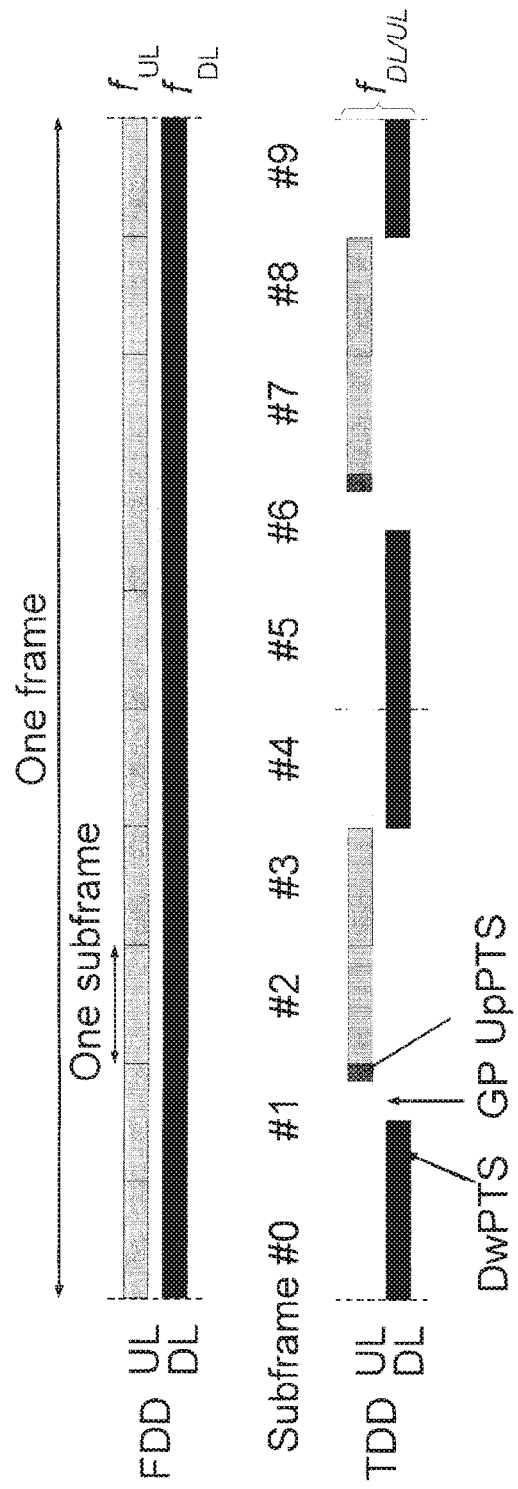
FIG. 2 is an illustrative example of an uplink/downlink time/frequency structure for LTE in the case of FDD and TDD.
Figure 3:
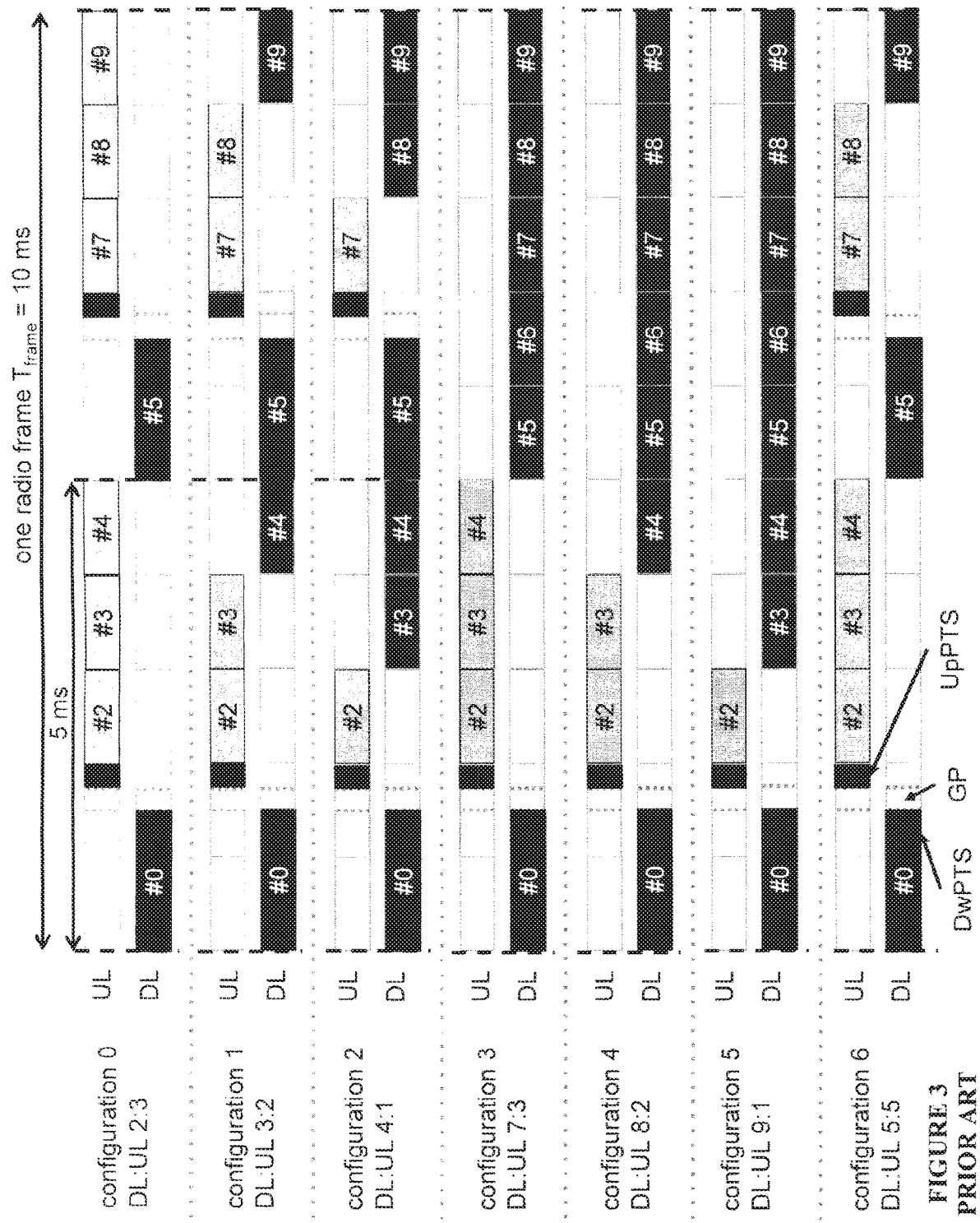
FIG. 3 is an illustrative example of the different uplink/downlink TDD configurations.

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

As part of the development of the example embodiments presented herein, a problem will first be identified and discussed.

Interband TDD Carrier Aggregation with Different UL-DL Configurations on Different Carries In LTE Release 10, carrier aggregation of TDD cells is specified with the restriction that the U/D configurations for all the aggregated cells are identical. The need to allow more flexible carrier aggregation of TDD cells is to be addressed in Release 11 of LTE.

The U/D configurations of neighboring cells need to be compatible to avoid severe interference problems. However, there are cases where the neighboring cells are operated by different operators or different wireless systems. The LTE TDD cells adjacent to those neighboring systems are hence required to adopt certain compatible U/D configurations. As a result, an operator may have several TDD cells having different U/D configurations on different frequencies.

To solve the HARQ control and A/N feedback timings in carrier aggregation systems with cells of different UL-DL configurations, WO2013/025143 and 3GPP TS 36.211 V11.1.0 3rd Generation Partnership Project; Technical Specification Group Radio Access Network; Evolved Universal Terrestrial Radio Access (E-UTRA); Physical channels and modulation (Release 11), taught that a user equipment is configured with at least one of two timing configuration numbers. The first timing configuration number is a PDSCH HARQ control timing configuration number for determining PDSCH HARQ A/N timings across all aggregated cells. The second timing configuration number is a PUSCH control timing configuration number for determining PUSCH scheduling and the corresponding HARQ A/N timings on PHICH across all aggregated cells.

As an example to illustrate the mechanism discussed above, consider PUSCH A/N feedback timing for a user equipment configured with carrier aggregation but and self-scheduling with configuration 1 cell and a configuration 2 cell shown in FIG. 4A and FIG. 4B, respectively. As shown in FIG. 4A, table 3 may be utilized to determine the UL HARQ control timing for a configuration 1 cell. Utilizing the n-k calculation, it is determined that such HARQ A/N feedbacks for PUSCH is transmitted from subframes 2, 3, 7 and 8 to subframes 6, 9, 1 and 4, respectively. Similarly, for a configuration 2 cell, utilizing the n-k calculation, FIG. 4B illustrates HARQ A/N feedbacks for PUSCH are transmitted from subframes 2 and 7 to subframes 6 and 1, respectively.

For a user equipment configured with these two serving cells with cross-carrier scheduling, the UL feedback is changed for the scheduled cell in some UL/DL configurations to allow more UL subframes to be scheduled. Examples of such scheduling are provided in WO2013/025143 and 3GPP TS 36.211 V11.1.0 3rd Generation Partnership Project; Technical Specification Group Radio Access Network; Evolved Universal Terrestrial Radio Access (E-UTRA); Physical channels and modulation (Release 11).

Overview of the Example Embodiments

In current 3GPP standards, the possibility of a user equipment being served by an aggregated FDD and TDD carrier simultaneously is not discussed or addressed. Thus, at least one example object of the example embodiments presented herein is to provide mechanisms to provide uplink scheduling and HARQ control timing for a FDD and TDD carrier aggregated network.

Therefore, some of the example embodiments presented herein are directed towards how to allocate the HARQ timing and scheduling timing for PUSCH transmission, for example, UL HARQ. According to some of the example embodiments, depending on which if either FDD or a certain UL/DL configuration for TDD is used, an applicable reference configuration is selected for the HARQ timing. An advantage of the example embodiments is the ability to provide a simple scheme to derive the subframes for the timing of HARQ and scheduling for TDD and FDD aggregation.

The applicable scheduling and HARQ timing for a user equipment performing aggregation between a FDD carrier and a TDD carrier depends on which of the carriers the scheduling is performed from. In addition, what impacts the applicable timings are whether the user equipment is configured with cross-carrier scheduling or not. The example embodiments are mostly described from the basis of only aggregation between two carriers although it is assumed that the aggregation may also be extended to more than two carriers.

In this section, the example embodiments will be illustrated in more detail by a number of examples. It should be noted that these examples are not mutually exclusive. Components from one example embodiment may be tacitly assumed to be present in another embodiment and a person skilled in the art may use any number of the example embodiments in other example embodiments.

The example embodiments will be presented as follows. First, example embodiments directed towards the FDD based cell functioning as the scheduling cell, as described under the heading "The FDD based cell as the scheduling cell". Examples of scheduling for a TDD based SCell and a FDD based PCell are provided under the subheadings "Scheduled SCell follows FDD timing" and "Scheduled SCell follows TDD timing".

Numerous example embodiments are directed towards the TDD based cell functioning as the scheduling cell as described under the heading "The TDD based cell as the scheduling cell". Examples of such scheduling for the FDD based SCell and a TDD based PCell are provided under the subheadings "Scheduled SCell follows TDD timing", "Scheduled SCell follows FDD timing", "Scheduled SCell follows timing according to subframe hierarchy", "FDD SCell scheduling based on revised tables" and "Cases where the PHICH is transmitted on the scheduled FDD cell".

Finally, example node configurations and example node operations are provided under the subheadings "Example node configuration" and "Example node operations", respectively. It should be appreciated that in the example embodiments described herein, the scheduling cell may be the PCell or a different SCell. In the example embodiments described herein, it is SCell which is scheduled (i.e., the scheduled cell).

The FDD Based Cell as the Scheduling Cell
 Scheduled SCell Follows FDD Timing
  According to some of the example embodiments, the HARQ-ACK for a PUSCH on a scheduled SCell is transmitted from the serving cell that carried the scheduling PDCCH/ePDCCH. The PUSCH scheduling and PHICH timings of a TDD SCell shall follow those for the FDD scheduling cell. Subframes which map toward a DL subframe on the SCell are excluded from the timing. Such example embodiments are illustrated in FIG. 5.

Figure 5:
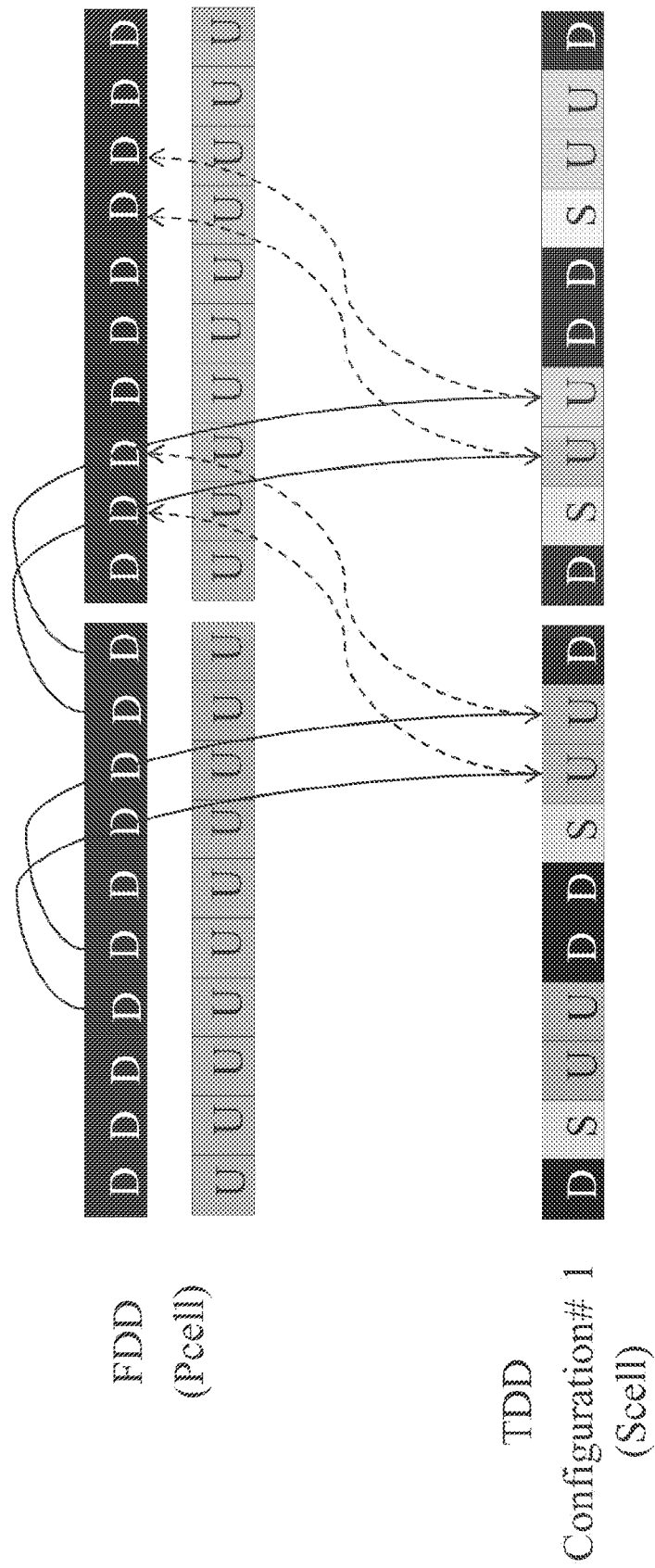
FIG. 5 illustrates an example of control timing scheduling for a FDD based PCell and scheduling cell and a TDD based SCell and scheduled cell, wherein the TDD based scheduled cell follows a FDD control timing configuration, according to some of the example embodiments.

FIG. 5 illustrates a FDD based cell as the primary cell and the scheduling cell. The secondary cell, which is the scheduled cell, is a TDD based cell with a configuration of 1. As shown in FIG. 5, HARQ-ACK for PUSCH is scheduled with a timing value of 4 for all subframes for a PUSCH. Thus, uplink subframes 7, 8, 2 and 3 of the TDD based cell are scheduled for HARQ-ACK to subframes 1, 2, 6 and 7, of the FDD based cell, respectively. It should be appreciated that scheduled HARQ-ACK timings that map to a downlink subframe on the secondary scheduled TDD based cell are excluded from feedback.

Scheduled SCell Follows TDD Timing

According to some of the example embodiments, the HARQ-ACK for a PUSCH on the scheduled SCell is transmitted from the scheduled SCell. The PUSCH scheduling and PHICH timings of a TDD SCell shall follow its own timings as defined by its own UL/DL configuration. Such example embodiments are illustrated in FIG. 6.

Figure 6:
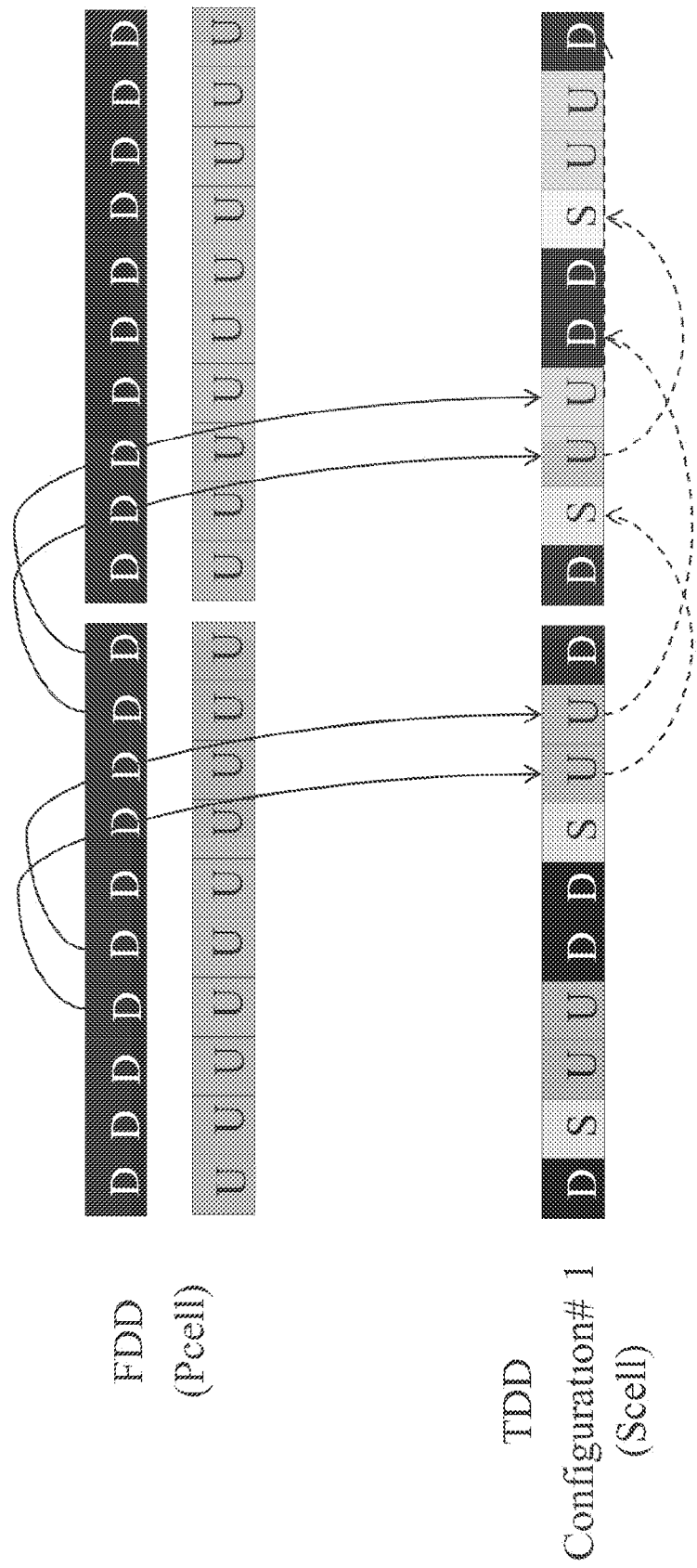
FIG. 6 illustrates an example control timing scheduling for a FDD based PCell and scheduling cell and a TDD based SCell and scheduled cell, wherein the TDD based scheduled cell follows its own control timing configuration, according to some of the example embodiments.

FIG. 6 illustrates a FDD based cell as the primary and the scheduling cell and the secondary and scheduled cell as a TDD based cell with a configuration of 1. As illustrated, the scheduled cell follows HARQ-ACK timings according to table 3. Utilizing the n+k calculation, PUSCH from subframes 7, 8, 2 and 3 are scheduled for HARQ-ACK in subframes 1, 4, 6 and 9, respectively, in the TDD based cell.

The TDD Based Call as the Scheduling Cell

According to some of the example embodiments, the HARQ-ACK for a PUSCH on the scheduled SCell is transmitted from the serving cell that carried the scheduling PDCCH/ePDCCH.

Scheduled SCell Follows TDD Timing

According to some of the example embodiments, the PUSCH scheduling and PHICH timings of a FDD SCell shall follow those for the TDD scheduling cell. Such example embodiments are illustrated in FIG. 7 and FIG. 8.

Figure 7:
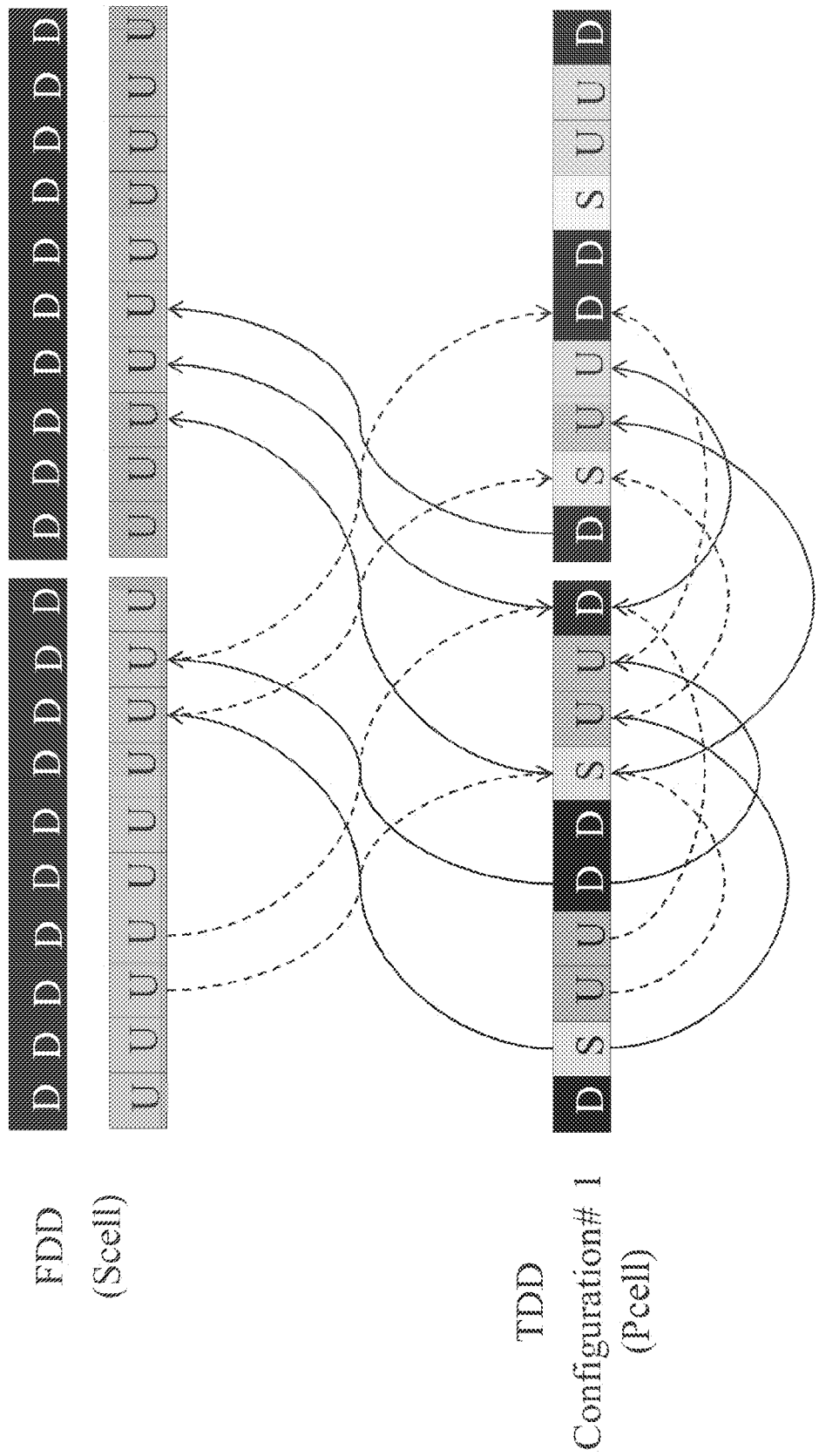
FIGS. 7 and 8 illustrate example control timing scheduling for a TDD based PCell and scheduling cell and a FDD based SCell and scheduled cell, wherein the FDD based scheduled cell follows the configuration timing of the TDD based PCell, according to some of the example embodiments.

FIG. 7 illustrates a FDD based SCell which is also the scheduled cell. FIG. 7 further illustrates a TDD based PCell with a configuration of 1 which is also the scheduling cell. In FIG. 7, the solid lines indicate PUSCH scheduling timings and the dashed lines indicate PHICH timings. For the case of a TDD configuration 1 PCell and a FDD SCell, four SCell UL subframes are to be schedulable, specifically, subframes 2, 3, 7 and 8. These subframes are scheduled according to table 3 via the n+k calculation. Thus, as provided by table 3, HARQ-ACK timings for subframes 2, 3, 7 and 8 of the FDD based SCell are scheduled to subframes 6, 9, 1 and 4, respectively, of the TDD based PCell.

Figure 8:
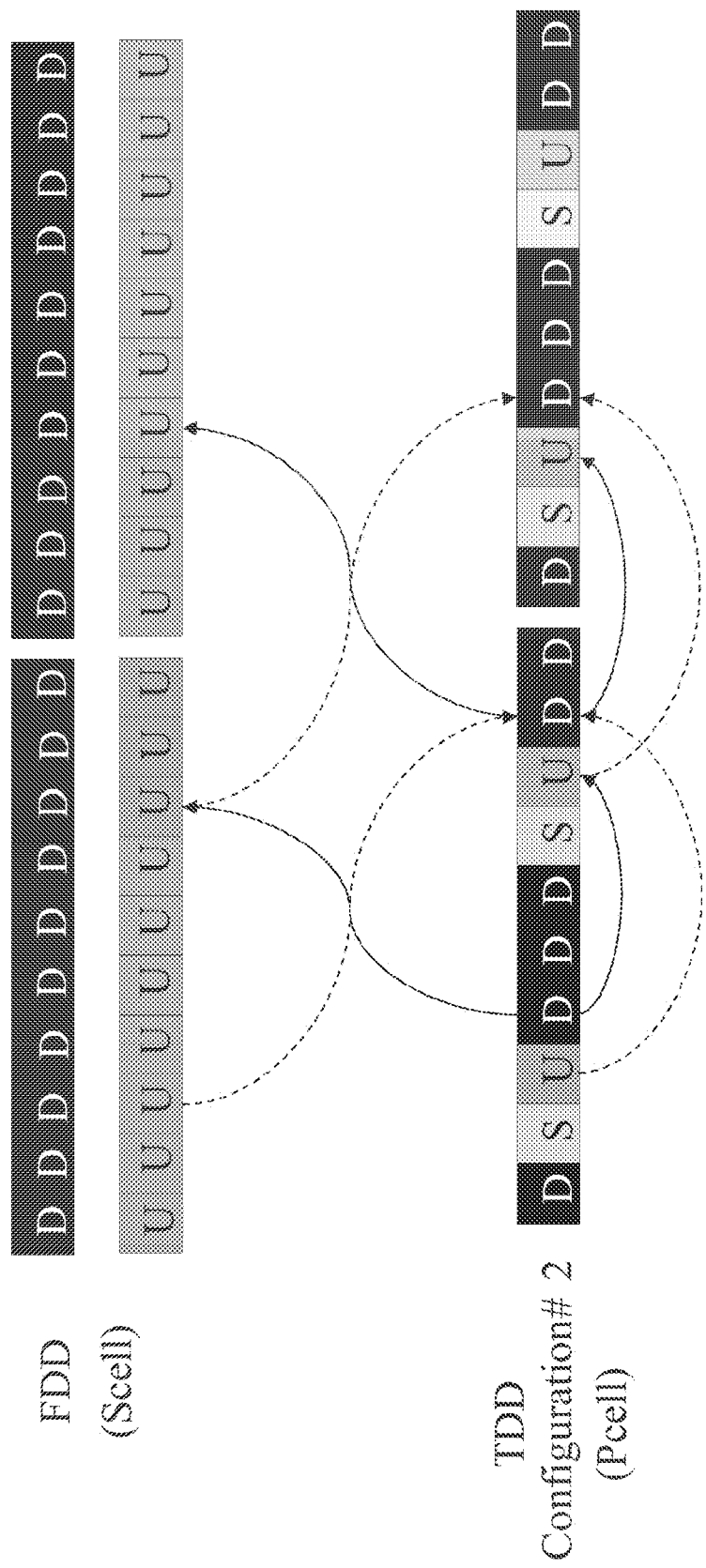

FIG. 8 illustrates a FDD based SCell which is also the scheduled cell. FIG. 8 further illustrates a TDD based PCell with a configuration of 2 which is also the scheduling cell. In FIG. 8, the solid lines indicate PUSCH scheduling timings and the dashed lines indicate PHICH timings. For the case of a TDD configuration 2 PCell and a FDD SCell, two SCell UL subframes are schedulable, specifically, subframes 2 and 7. These subframes are scheduled according to table 3 via the n+k calculation. Thus, as provided by table 3, HARQ-ACK timing for subframes 2 and 7 of the FDD based SCell are scheduled to subframes 8 and 3, respectively, of the TDD based PCell.

Scheduled SCell Follows FDD Timing

According to some of the example embodiments, the PUSCH scheduling and PHICH timings of a FDD SCell shall follow its own timings. Specifically, the FDD SCell shall be scheduled with a timing value of 4 for all subframes for a PUSCH. It should be appreciated that FDD scheduling which maps to downlink subframes in the TDD based cell are excluded from PUSCH timing.

Figure 9:
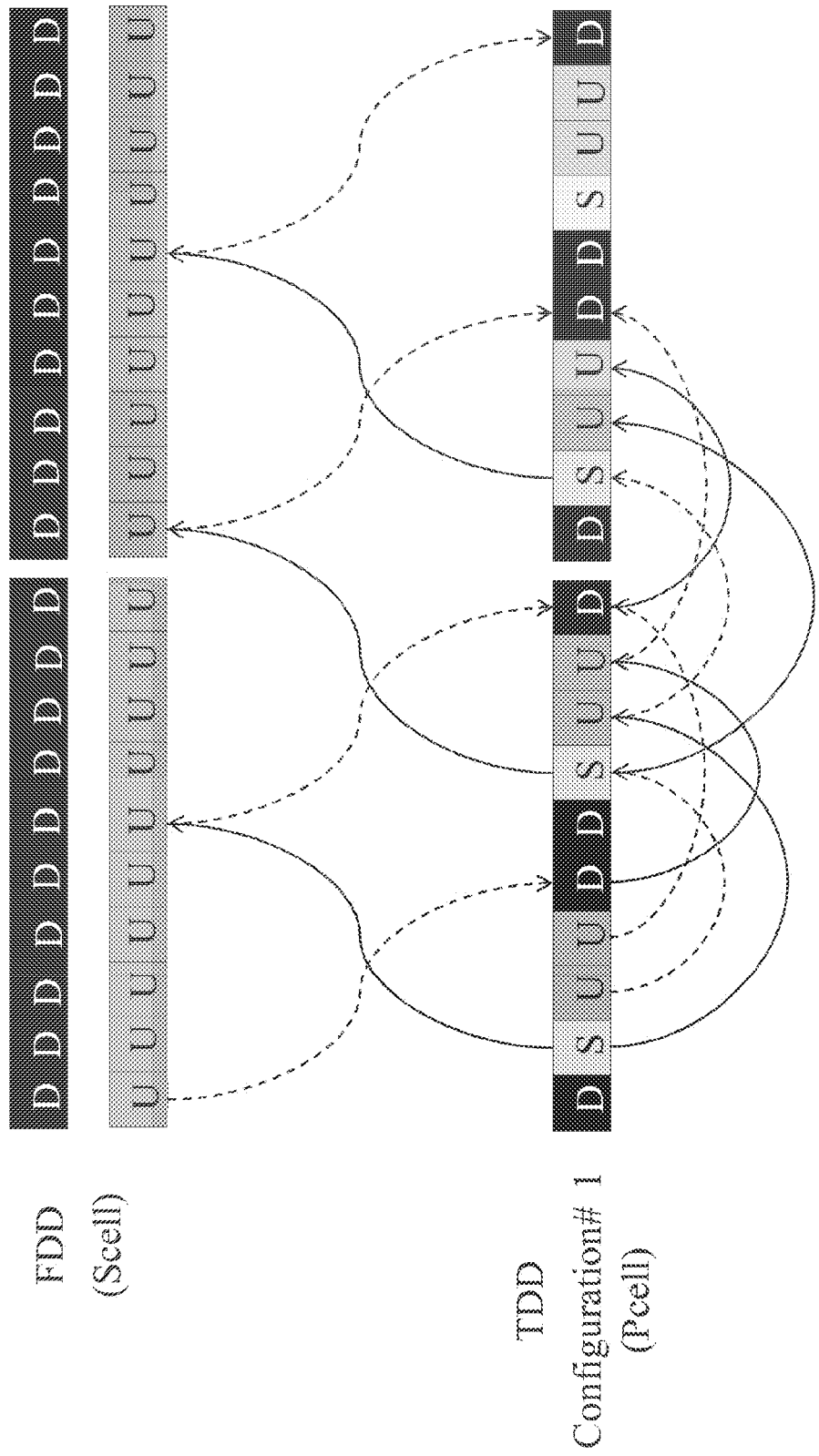
FIGS. 9 and 10 illustrate example control timing scheduling for a TDD based PCell and scheduling cell and a FDD based SCell and scheduled cell, wherein the FDD based scheduled cell follows its own configuration timing, according to some of the example embodiments.

FIG. 9 provides an illustrative example of such an embodiment. In FIG. 9, the solid lines indicate PUSCH scheduling timings and the dashed lines indicate PHICH timings. As shown in FIG. 9, a TDD based PCell, which is functioning as the scheduling cell, with a configuration of 1 is aggregated with a FDD based SCell, which is functioning as the scheduled cell. In such a configuration, two SCell UL subframes may be scheduled, specifically, subframes 0 and 5. Therefore, utilizing the timing value of 4 for all subframes, the PHICH for subframes 0 and 5 of the FDD based SCell are scheduled to subframes 4 and 9 of the TDD based PCell. It should be appreciated that utilizing this example embodiment, a HARQ-ACK scheduling of the FDD based cell subframe 3 is not possible as the PHICH for subframe 3 would be scheduled to subframe 7 of the TDD based cell, which is an UL cell.

Figure 10:
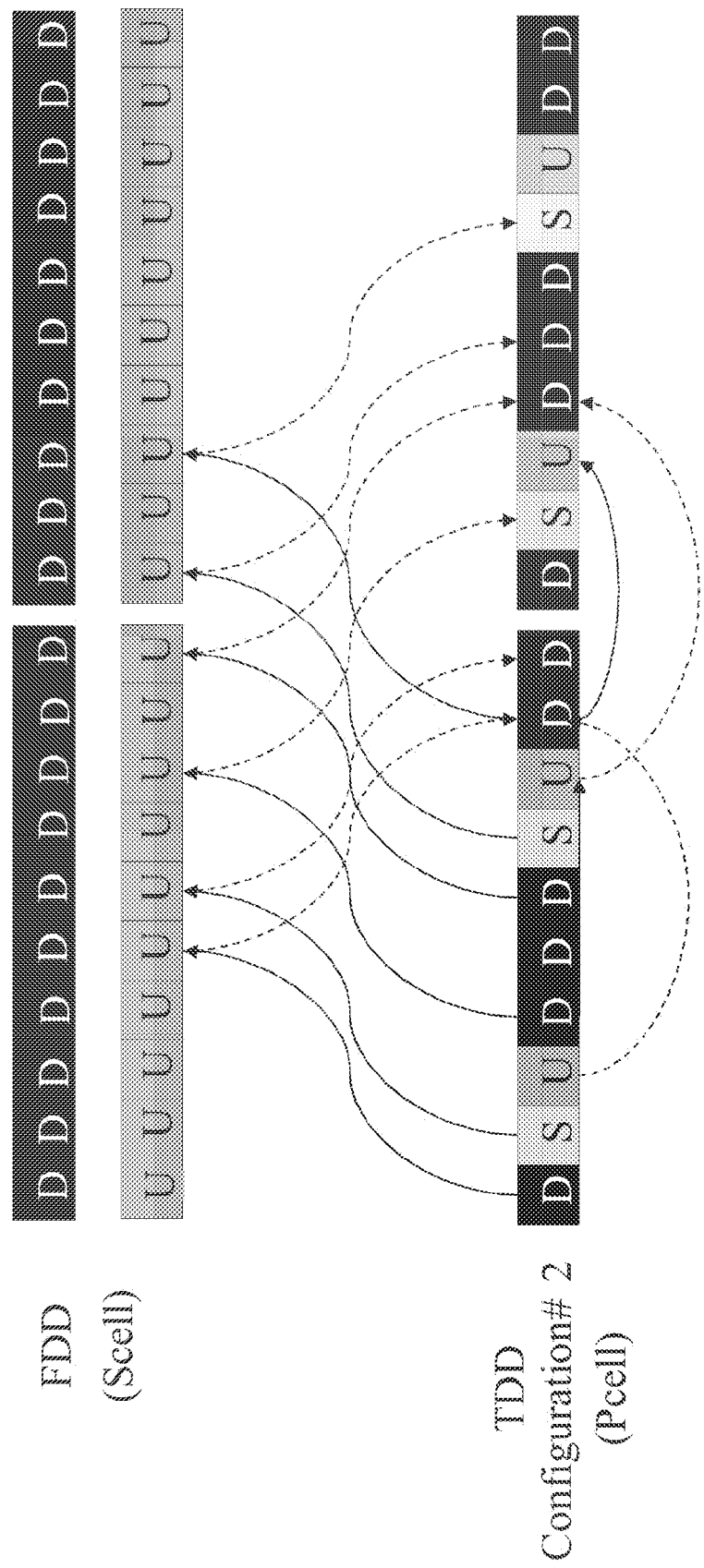

FIG. 10 provides another illustrative example of PUSCH scheduling and PHICH timings in which a FDD SCell follows its own timing. In FIG. 10, the solid lines indicate PUSCH scheduling timings and the dashed lines indicate PHICH timings. As shown in FIG. 10, a TDD based PCell, which is functioning as the scheduling cell, with a configuration of 2 is aggregated with a FDD based SCell, which is functioning as the scheduled cell. In such a configuration, six SCell UL subframes may be scheduled, specifically, subframes 4, 5, 7, 9, 0 and 2. Therefore, utilizing the timing value of 4 for all subframes, subframes 4, 5, 7, 9, 0 and 2 of the FDD based SCell are scheduled to subframes 8, 9, 1, 3, 4 and 6 of the TDD based PCell. It should be appreciated that utilizing this example embodiment, a HARQ-ACK scheduling of the FDD based cell subframe 3 is not possible as subframe 3 would be scheduled to subframe 7 of the TDD based cell, which is an UL cell.

Scheduled SCell Follows Timing According to Subframe Hierarchy

Figure 11:
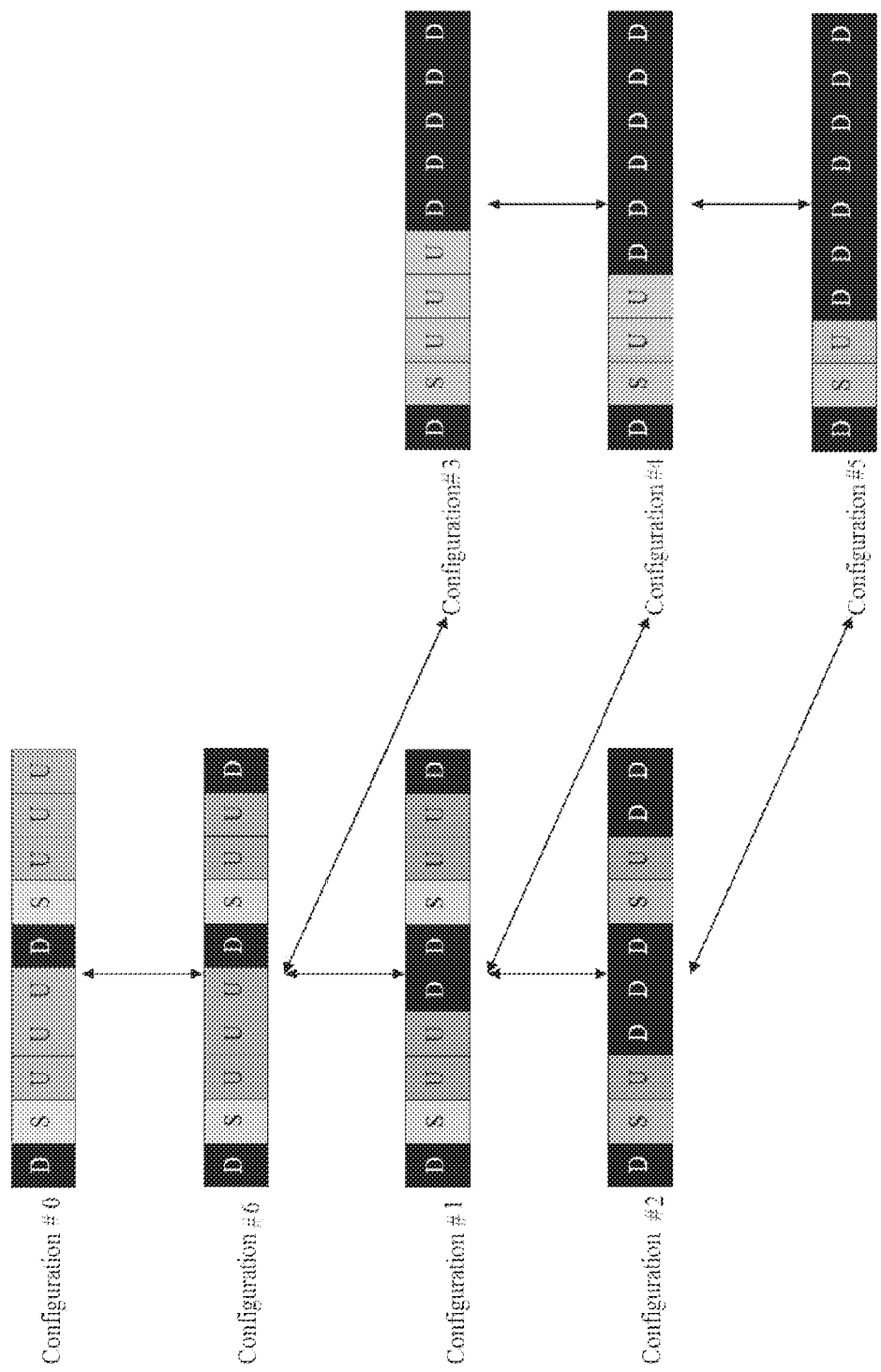
FIG. 11 illustrates an example of subframe hierarchy, according to some of the example embodiments.

According to some of the example embodiments, the choice of which configuration the SCell shall use for determining HARQ control timing is based on a subframe hierarchy, as illustrated in FIG. 11. It should be appreciated that the hierarchical ordering of FIG. 11 is further described in WO2013/025143.

The subframe hierarchy may be designed with the following principles:

(1) The UL subframes in a TDD configuration are also UL subframes in those TDD configurations that can be corrected with upward arrows.

For example, subframes 2 and 3 are UL subframes in configuration 4. These two subframes are also UL in configurations 3, 1, 6 and 0, all of which can be connected from configuration 4 with upward arrows. As a second example, subframes 2 and 7 are UL subframes in configuration 2. These two subframes are not both UL in configuration 3 because there is no upward arrow connecting the two configurations.

(2) The DL subframes in a TDD configuration are also DL subframes in those TDD configurations that can be corrected with downward arrows.

For example, subframe 0, 1, 5, 6 and 9 are DL subframes in configuration 6. These five subframes are also DL in configurations 1, 2, 3, 4 and 5, all of which can be connected from configuration 6 with downward arrows. As a second example, subframe 7 is a DL subframe in configuration 3 but not a DL subframe in configuration 2 because there is no downward arrow connecting the two configurations.

With these design properties, the subframe hierarchy may provide the following utility:

(1) Given a set of TDD configurations to be aggregated, a TDD configuration that can be connected from all of the given TDD configurations with upward arrows has the following two properties:

The TDD configuration comprises UL subframes that are a superset of all UL subframes from all given TDD configurations.

The TDD configuration comprises DL subframes that are available in all given TDD configurations.

Given the subframe hierarchy described above, according to some of the example embodiments, the PUSCH scheduling and PHICH timings of a FDD SCell shall follow those defined for a UL/DL configuration 0 TDD cell. Alternatively, UL/DL configuration 6 could be used. The advantage of this example embodiment is that six (or alternatively five) UL subframes on the FDD SCell may always be scheduled. However, one example drawback may be that the PUSCH round trip time for the FDD SCell may become greater than 10 ms.

Figure 12:
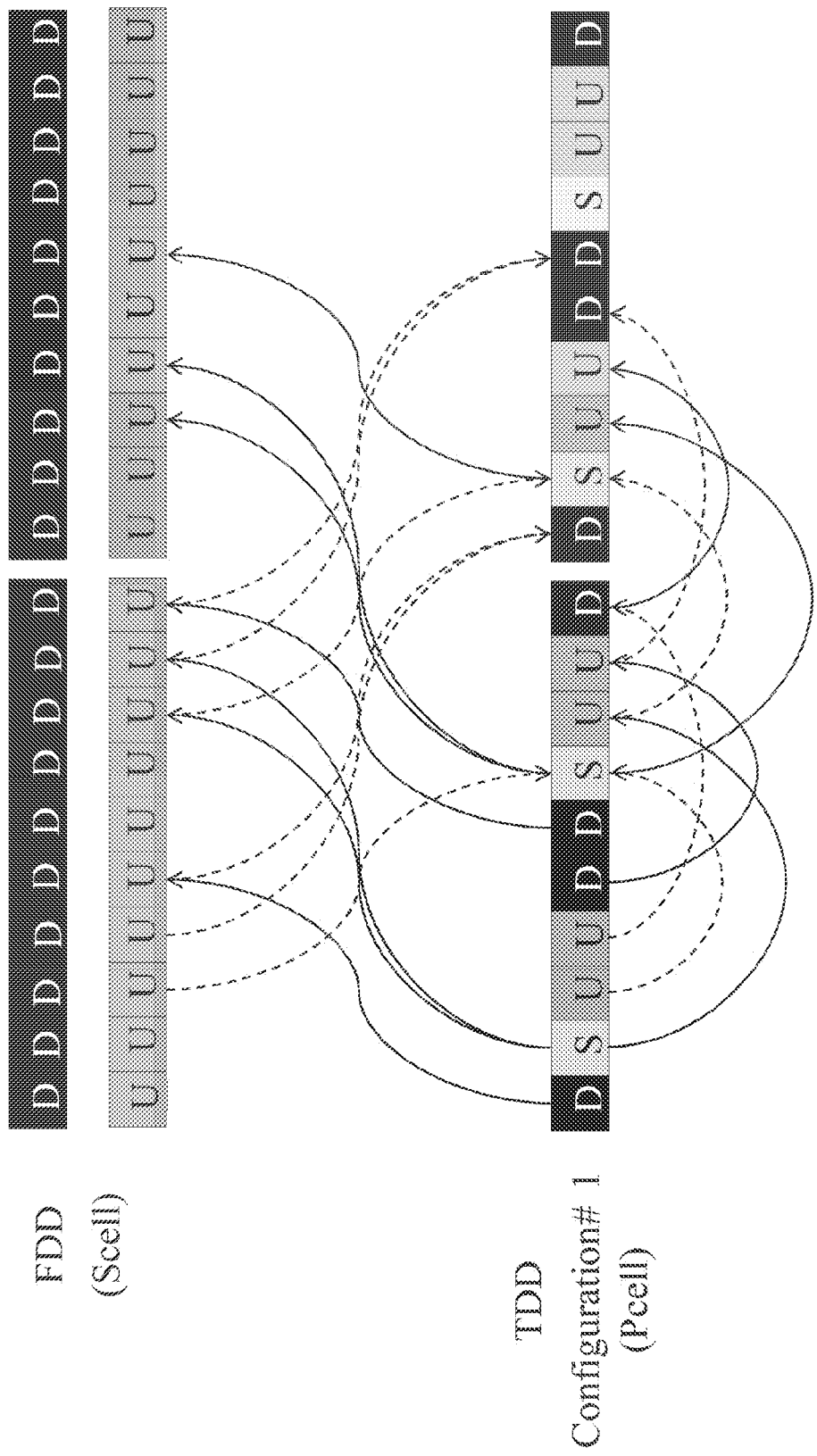
FIGS. 12 and 13 illustrate example control timing scheduling for a TDD based PCell and scheduling cell and a FDD based SCell and scheduled cell, wherein the FDD based scheduled cell follows a configuration timing of configuration 0 or 6 based on the subframe hierarchy of FIG. 11, according to some of the example embodiments.

FIG. 12 illustrates an example of FDD SCell scheduling based on the subframe hierarchy as illustrated in FIG. 11. In FIG. 12, the solid lines indicate PUSCH scheduling timings and the dashed lines indicate PHICH timings. As shown in FIG. 12, the FDD based SCell, which functions as the scheduled cell, is aggregated with a TDD based PCell with a configuration of 1, which functions as the scheduling cell. As illustrated, the FDD SCell provides HARQ-ACK timing via configuration 0 as provided in table 3. Thus, using the n+k calculation, subframes 2, 3, 4, 7, 8, and 9 of the FDD based SCell provide HARQ-ACK feedback to subframes 6, 0, 0, 1, 5 and 5, respectively, of the TDD based PCell.

Figure 13:
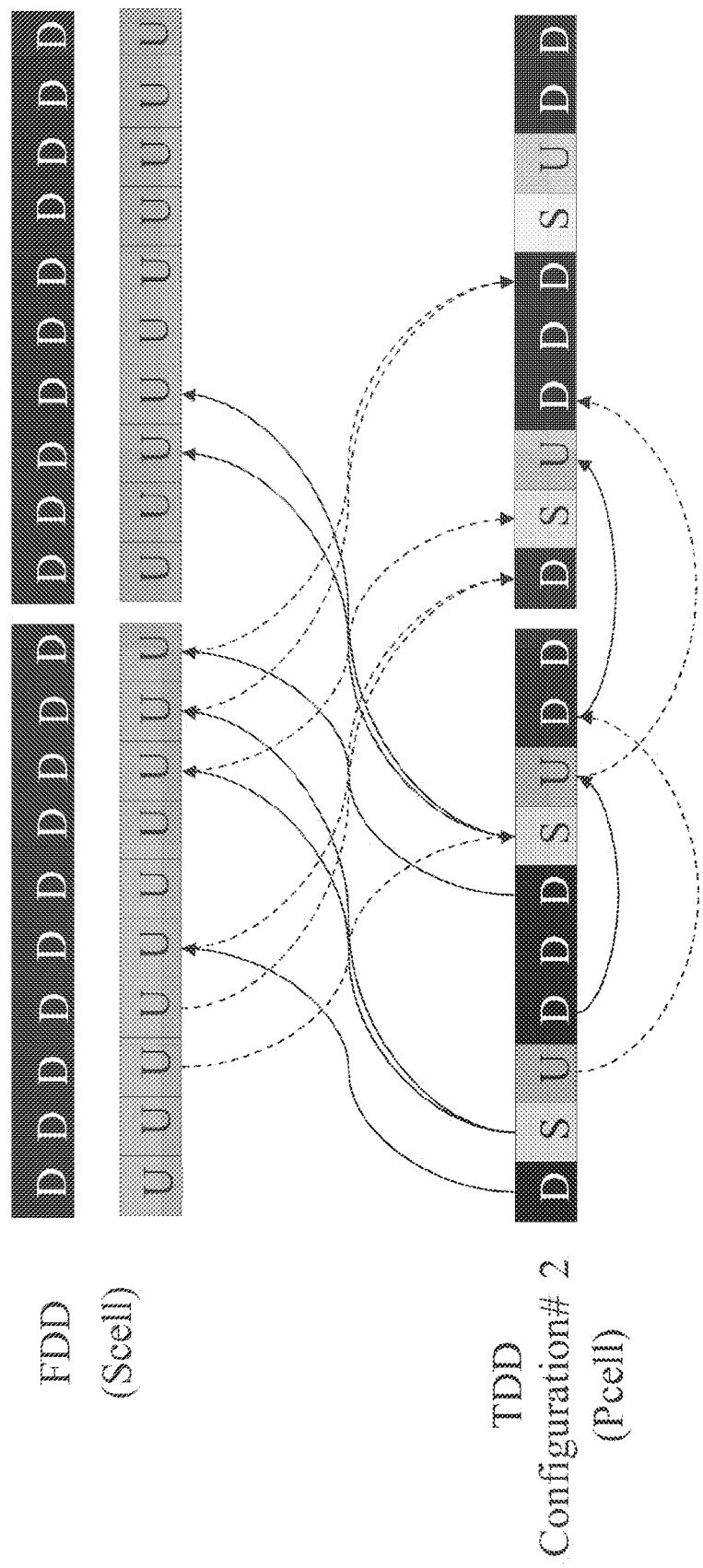

FIG. 13 illustrates another example of FDD SCell scheduling based on the subframe hierarchy as illustrated in FIG. 11. In FIG. 13, the solid lines indicate PUSCH scheduling timings and the dashed lines indicate PHICH timings. As shown in FIG. 13, the FDD based SCell, which functions as the scheduled cell, is aggregated with a TDD based PCell with a configuration of 2, which functions as the scheduling cell. As illustrated, the FDD SCell provides HARQ-ACK timing via configuration 0 as provided in table 3. Thus, using the n+k calculation, subframes 2, 3, 4, 7, 8, and 9 of the FDD based SCell provide HARQ-ACK feedback to subframes 6, 0, 0, 1, 5 and 5, respectively, of the TDD based PCell.

FDD SCell Scheduling Based on Revised Tables

According to some of the example embodiments FDD based SCells may be scheduled with the use of revised tables. Such revised tables may be provided with the use of a combination of the above explained embodiments.

Thus, according to some of the example embodiments, the PUSCH scheduling and PHICH timings of a FDD SCell shall follow: (1) UL/DL configuration 1 as the UL timing reference configuration if the UL/DL configuration of the scheduling TDD cell is 2, 4 or 5; and (2) UL/DL configuration of the scheduling cell as the UL timing reference configuration if the UL/DL configuration of the scheduling TDD cell is 0, 1, 3 or 6. The power control of the PUSCH transmitted on the scheduled FDD Scell shall incorporate the transmit power control command transmitted within the scheduling DCI according to the above defined UL timing reference configuration.

For a FDD SCell scheduled from a TDD UL/DL configurations 1-6 cell and normal HARQ operation, the user equipment shall upon detection of a PDCCH/ePDCCH with uplink DCI format and/or a PHICH transmission in subframe n intended for the user equipment, adjust the corresponding PUSCH transmission in subframe n+k, with k given in Table 5.

For a FDD SCell scheduled from a TDD UL/DL configuration 0 cell and normal HARQ operation, the user equipment shall upon detection of a PDCCH/ePDCCH with uplink DCI format and/or a PHICH transmission in subframe n intended for the user equipment, adjust the corresponding PUSCH transmission in subframe n+k if the MSB of the UL index in the PDCCH/EPDCCH with uplink DCI format is set to 1 or PHICH is received in subframe n=0 or 5 in the resource corresponding to $I_{PHICH}=0$ with k given in Table 5. If the LSB of the UL index in the DCI format 0/4 is set to 1 in subframe n or a PHICH is received in subframe n=0 or 5 in the resource corresponding to $I_{PHICH}=1$ or PHICH is received in subframe n=1 or 6, the user equipment shall adjust the corresponding PUSCH transmission in subframe n+7. If both the MSB and LSB of the UL index in the PDCCH/ePDCCH with uplink DCI format are set in subframe n, the user equipment shall adjust the corresponding PUSCH transmission in both subframes n+k and n+7, with k given in Table 5.

TABLE 5

Effective k for a FDD Scell scheduled from a TDD cell

| TDD UL/DL Configuration of the scheduling cell | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | 6 | | | 4 | | 6 | | | 4 |
| 3 | 4 | | | | | | | | 4 | 4 |
| 4 | | 6 | | | 4 | | 6 | | | 4 |
| 5 | | 6 | | | 4 | | 6 | | | 4 |
| 6 | 7 | 7 | | | | | 7 | 7 | | 5 |

For a FDD SCell scheduled from a TDD UL/DL configuration 1-6 cell, an HARQ-ACK received on the PHICH assigned to a user equipment in subframe i is associated with the PUSCH transmission in the subframe i-k as indicated by the following Table 6.

For a FDD SCell scheduled from a TDD UL/DL configuration 0 cell, an HARQ-ACK received on the PHICH in the resource corresponding to $I_{PHICH}=0$, assigned to a user equipment in subframe i is associated with the PUSCH transmission in the subframe i-k as indicated by the following Table 6. An HARQ-ACK received on the PHICH in the resource corresponding to $I_{PHICH}=1$ assigned to a user equipment in subframe i is associated with the PUSCH transmission in the subframe i-6.

TABLE 6

Effective k for HARQ-ACK for a FDD Scell received from the PHICH on a TDD scheduling cell

| TDD UL/DL Configuration of the scheduling cell | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | 4 | | | 6 | | 4 | | | 6 |
| 3 | 6 | | | | | | | | 6 | 6 |
| 4 | | 4 | | | 6 | | 4 | | | 6 |
| 5 | | 4 | | | 6 | | 4 | | | 6 |
| 6 | 6 | 4 | | | | | 7 | 4 | | 6 |

For PUSCH transmissions transmitted on a FDD serving cell and scheduled from a TDD serving cell c in subframe n, the user equipment shall determine the corresponding PHICH resource of serving cell c in subframe $n+k_{PHICH}$, where $k_{PHICH}$ is given in Table 7.

It is further given if there is no PHICH resource available in the determined subframe, the user equipment should generate a local HARQ-ACK for the PHICH transmission. It is further given that a retransmission of an HARQ process would occur if the user equipment in such a scenario would receive an UL grant that indicates a retransmission occasion.

TABLE 7

Effective $k_{PHICH}$ for a FDD Scell scheduled from a TDD cell

| TDD UL/DL Configuration of the scheduling cell | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | | 4 | 7 | 6 | | 4 | 7 | 6 |
| 1 | | | | 4 | 6 | | | 4 | 6 | |
| 2 | | | | 4 | 6 | | | 4 | 6 | |
| 3 | | | | 6 | 6 | 6 | | | | |
| 4 | | | | 4 | 6 | | | 4 | 6 | |
| 5 | | | | 4 | 6 | | | 4 | 6 | |
| 6 | | | | 4 | 6 | 6 | | 4 | 7 | |

Within the downlink control information (DCI) transmitted to the user equipment via PDCCH/EPDCCH for scheduling PUSCH, there is a transmit power control (TPC) command. For a PUSCH transmission at subframe i on a FDD SCell scheduled from a TDD cell, the TPC command from subframe $i-K_{PUSCH}$ should be incorporated, where $K_{PUSCH}$ is given in Table 8.

TABLE 8

Effective $K_{PUSCH}$ for a FDD Scell scheduled from a TDD cell

| TDD UL/DL Configuration of the scheduling cell | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 6 | 4 | — | — | — | 6 | 4 | — |
| 3 | — | — | 4 | 4 | 4 | — | — | — | — | — |
| 4 | — | — | 6 | 4 | — | — | — | 6 | 4 | — |
| 5 | — | — | 6 | 4 | — | — | — | 6 | 4 | — |
| 6 | — | — | 7 | 7 | 5 | — | — | 7 | 7 | — |

Cases where the PHICH is Transmitted on the Scheduled FDD Cell

In this setup, the HARQ-ACK for a PUSCH on the scheduled SCell is transmitted on the scheduled cell. According to some of the example embodiments, the PUSCH scheduling and PHICH timings of a FDD SCell scheduled from a TDD cell shall follow: (1) UL/DL configuration 0 as the UL timing reference configuration if the UL/DL configuration of the scheduling TDD cell is 0; and (2) FDD PUSCH scheduling and PHICH timings if the UL/DL configuration of the scheduling TDD cell is 1-6. The power control of the PUSCH transmitted on the scheduled FDD Scell shall incorporate the transmit power control command transmitted within the scheduling DCI according to the FDD serving cell timing.

For a FDD SCell scheduled from a TDD UL/DL configurations 1-6 cell and normal HARQ operation, the user equipment shall upon detection of a PDCCH/EPDCCH with uplink DCI format and/or a PHICH transmission in subframe n intended for the user equipment, adjust the corresponding PUSCH transmission in subframe n+k, with k given in Table 9.

For a FDD SCell scheduled from a TDD UL/DL configuration 0 cell and normal HARQ operation, the user equipment shall upon detection of a PDCCH/EPDCCH with uplink DCI format and/or a PHICH transmission in subframe n intended for the user equipment, adjust the corresponding PUSCH transmission in subframe n+k if the MSB of the UL index in the PDCCH/EPDCCH with uplink DCI format is set to 1 or PHICH is received in subframe n=0 or 5 in the resource corresponding to $I_{PHICH}=0$ with k given in Table 9. If the LSB of the UL index in the DCI format 0/4 is set to 1 in subframe n or a PHICH is received in subframe n=0 or 5 in the resource corresponding to $I_{PHICH}=1$ or PHICH is received in subframe n=1 or 6, the user equipment shall adjust the corresponding PUSCH transmission in subframe n+7. If both the MSB and LSB of the UL index in the PDCCH/EPDCCH with uplink DCI format are set in subframe n, the user equipment shall adjust the corresponding PUSCH transmission in both subframes n+k and n+7, with k given in Table 9.

TABLE 9

Effective k for a FDD Scell scheduled from a TDD cell

| TDD UL/DL Configuration of the scheduling cell | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | 4 | 4 | | | 4 | 4 | 4 | | 4 |
| 2 | | 4 | 4 | | 4 | 4 | 4 | 4 | | 4 | 4 |
| 3 | | 4 | 4 | | | | 4 | 4 | 4 | 4 | 4 |
| 4 | | 4 | 4 | | | 4 | 4 | 4 | 4 | 4 | |
| 5 | | 4 | 4 | | 4 | 4 | 4 | 4 | 4 | 4 | |
| 6 | | 4 | 4 | | | | 4 | 4 | | | 4 |

For a FDD SCell scheduled from a TDD UL/DL configuration 1-6 cell, an HARQ-ACK received on the PHICH assigned to a UE in subframe i is associated with the PUSCH transmission in the subframe i-k as indicated by the following Table 10.

For a FDD SCell scheduled from a TDD UL/DL configuration 0 cell, an HARQ-ACK received on the PHICH in the resource corresponding to $I_{PHICH}=0$, assigned to a user equipment in subframe i is associated with the PUSCH transmission in the subframe i-k as indicated by the following Table 10. An HARQ-ACK received on the PHICH in the resource corresponding to $I_{PHICH}=1$ assigned to a user equipment in subframe i is associated with the PUSCH transmission in the subframe i-6.

TABLE 10

Effective k for HARQ-ACK for a FDD Scell received from the PHICH on a TDD scheduling cell

| TDD UL/DL Configuration of the scheduling cell | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | 7 | 4 | | |
| 1 | | 4 | | | 4 | 4 | 4 | | | 4 | 4 |
| 2 | | 4 | | 4 | 4 | 4 | 4 | | 4 | 4 | 4 |
| 3 | | 4 | 4 | 4 | 4 | 4 | | | | | 4 |
| 4 | | 4 | 4 | 4 | 4 | 4 | 4 | | | 4 | 4 |
| 5 | | 4 | 4 | 4 | 4 | 4 | 4 | | 4 | 4 | 4 |
| 6 | | 4 | | | | | 4 | 4 | | | 4 |

For PUSCH transmissions transmitted on a FDD serving cell and scheduled from a TDD serving cell c in subframe n, the user equipment shall determine the corresponding PHICH resource of serving cell c in subframe n+$k_{PHICH}$, where $k_{PHICH}$ is given in Table 11.

TABLE 11

Effective $k_{PHICH}$ for a FDD SCell scheduled from a TDD cell

| TDD UL/DL Configuration of the scheduling cell | subframe index n | | | | | | | | | |
|---|---|---|---|---|---|---|---|---|---|---|
| | 0 | 1 | 2 | 3 | 4 | 5 | 6 | 7 | 8 | 9 |
| 0 |   |   | 4 | 7 | 6 |   |   | 4 | 7 | 6 |
| 1 | 4 |   |   | 4 | 4 | 4 |   |   | 4 | 4 |
| 2 | 4 |   | 4 | 4 | 4 | 4 |   | 4 | 4 | 4 |
| 3 | 4 | 4 | 4 | 4 | 4 | 4 |   |   |   | 4 |
| 4 | 4 | 4 | 4 | 4 | 4 | 4 |   |   | 4 | 4 |
| 5 | 4 | 4 | 4 | 4 | 4 | 4 |   | 4 | 4 | 4 |
| 6 | 4 |   |   | 4 | 4 | 4 |   |   |   | 4 |

Within the downlink control information (DCI) transmitted to the user equipment via PDCCH/EPDCCH for scheduling PUSCH, there is a transmit power control (TPC) command. For a PUSCH transmission at subframe i on a FDD SCell scheduled from a TDD cell, the TPC command from subframe $i-K_{PUSCH}$ should be incorporated, where $K_{PUSCH}$ is given in Table 12.

TABLE 12

Effective $K_{PUSCH}$ for a FDD SCell scheduled from a TDD cell

| TDD UL/DL Configuration of the scheduling cell | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | 4 | — | — | 4 | 4 | 4 | — | — | 4 | 4 |
| 2 | 4 | — | 4 | 4 | 4 | 4 | — | 4 | 4 | 4 |
| 3 | 4 | 4 | 4 | 4 | 4 | 4 | — | — | — | 4 |
| 4 | 4 | 4 | 4 | 4 | 4 | 4 | — | — | 4 | 4 |
| 5 | 4 | 4 | 4 | 4 | 4 | 4 | — | 4 | 4 | 4 |
| 6 | 4 | — | — | 4 | 4 | 4 | — | — | — | 4 |

Figure 14:
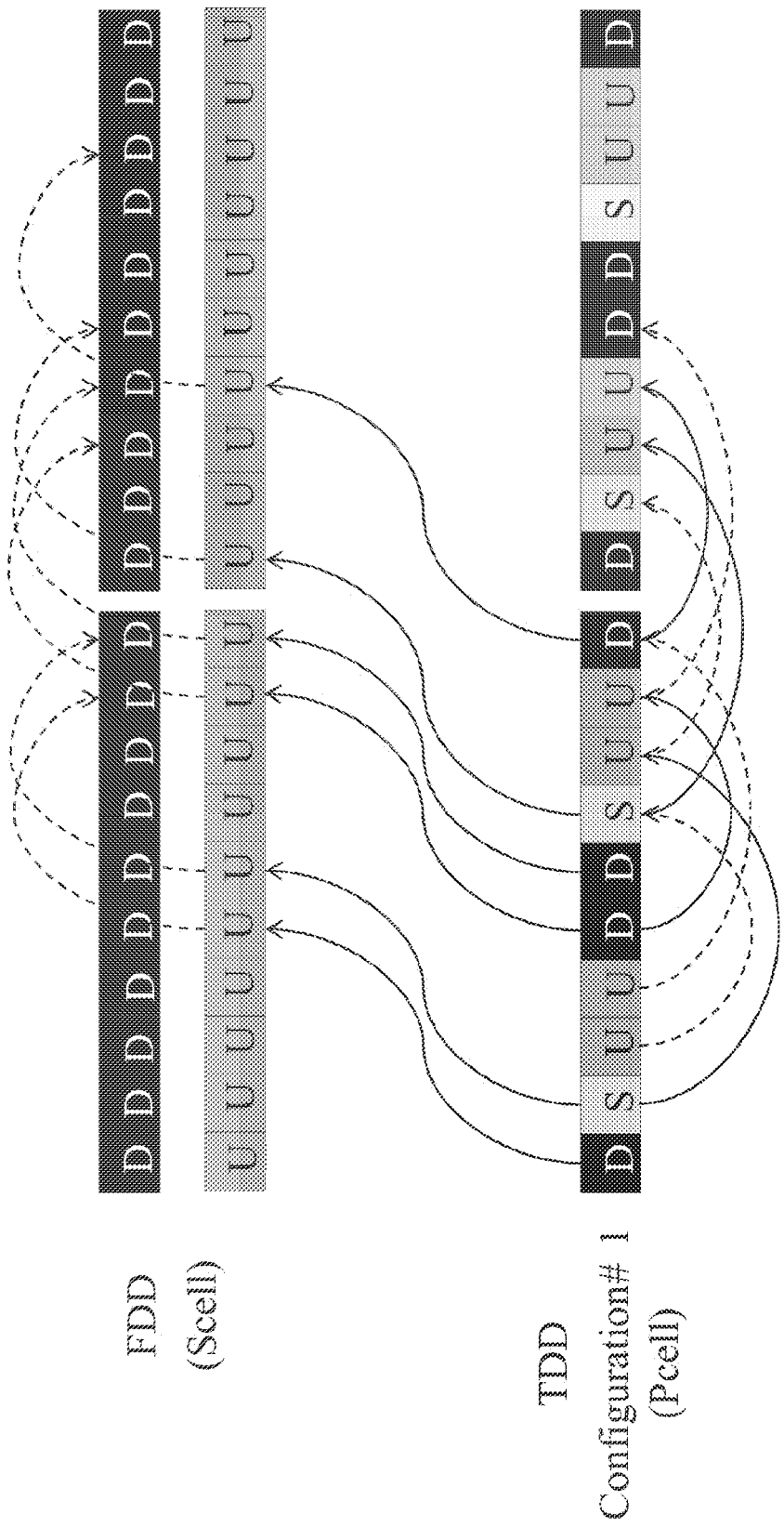
FIGS. 14 and 15 illustrate example control timing scheduling for a TDD based PCell and scheduling cell and a FDD based SCell and scheduled cell, wherein the FDD based scheduled cell follows a configuration timing according to revised tables, according to some of the example embodiments.

FIG. 14 is an illustrative example of FDD based SCell scheduling based on the revised tables presented above. In FIG. 14, the solid lines indicate PUSCH scheduling timings and the dashed lines indicate PHICH timings. As illustrated in FIG. 14, a FDD based SCell, which functions as the scheduled cell, is aggregated with a TDD based PCell with a configuration number of 1, which functions as the scheduling cell. In the example embodiment illustrated in FIG. 14, table 11 is used to determine the HARQ-ACK feedback timing. Thus, utilizing the n+k calculation of table 11, subframes 4, 5, 8, 9, 0 and 3 of the FDD based scheduled cell are scheduled to subframes 8, 9, 2, 3, 4 and 7, respectively, of the FDD based scheduled cell.

Figure 15:
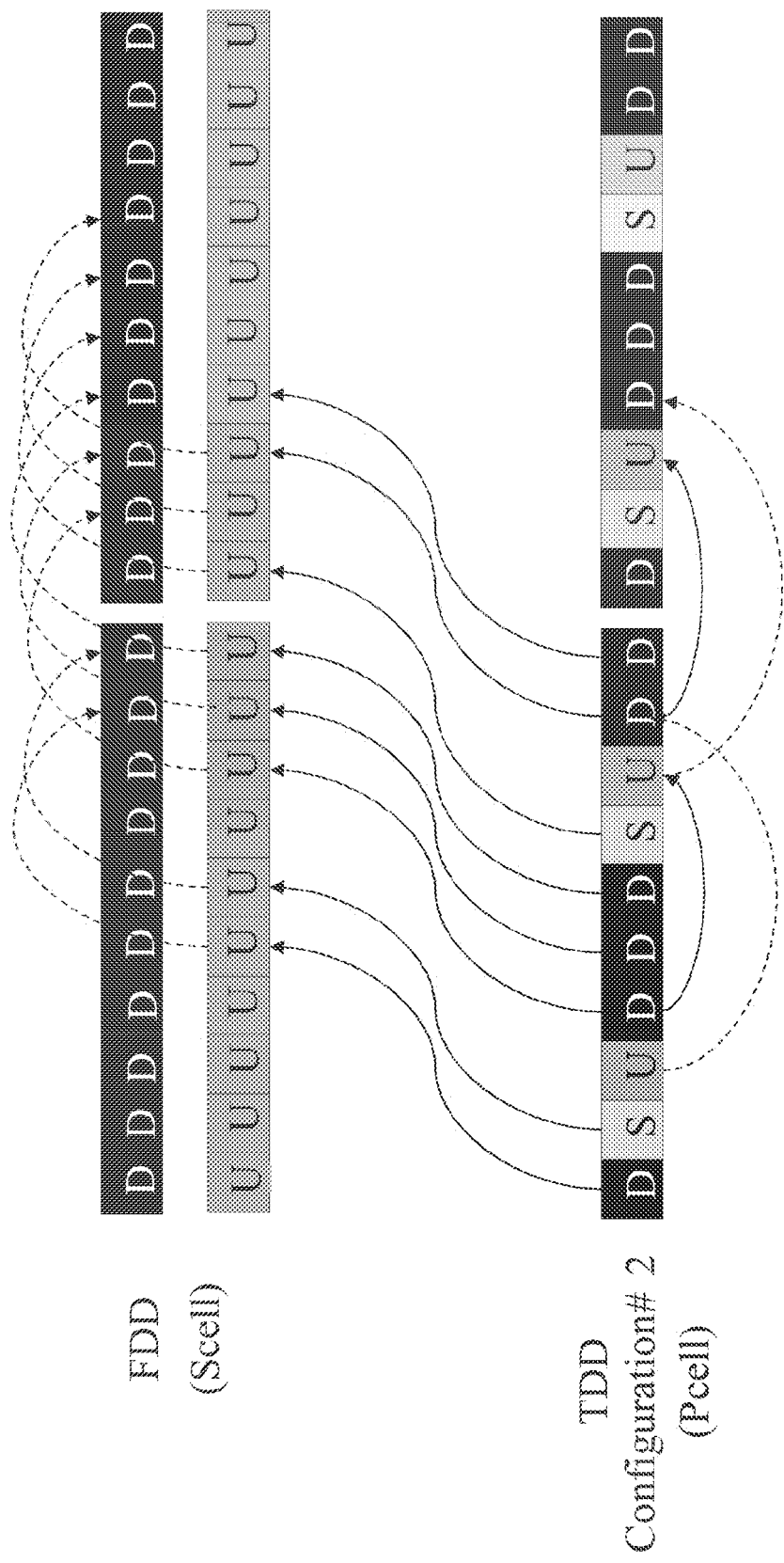

FIG. 15 is an illustrative another example of FDD based SCell scheduling based on the revised tables presented above. In FIG. 15, the solid lines indicate PUSCH scheduling timings and the dashed lines indicate PHICH timings. As illustrated in FIG. 15, a FDD based SCell, which functions as the scheduled cell, is aggregated with a TDD based PCell with a configuration number of 2, which functions as the scheduling cell. In the example embodiment presented in FIG. 15, table 11 is used to determine the HARQ-ACK feedback timing. Thus, utilizing the n+k calculation of table 11, subframes 4, 5, 7, 8, 9, 0, 1 and 2 of the FDD based scheduled cell are scheduled to subframes 8, 9, 1, 2, 3, 4, 5 and 6, respectively, of the FDD based scheduled cell.

Example Node Configurations

Figure 16:
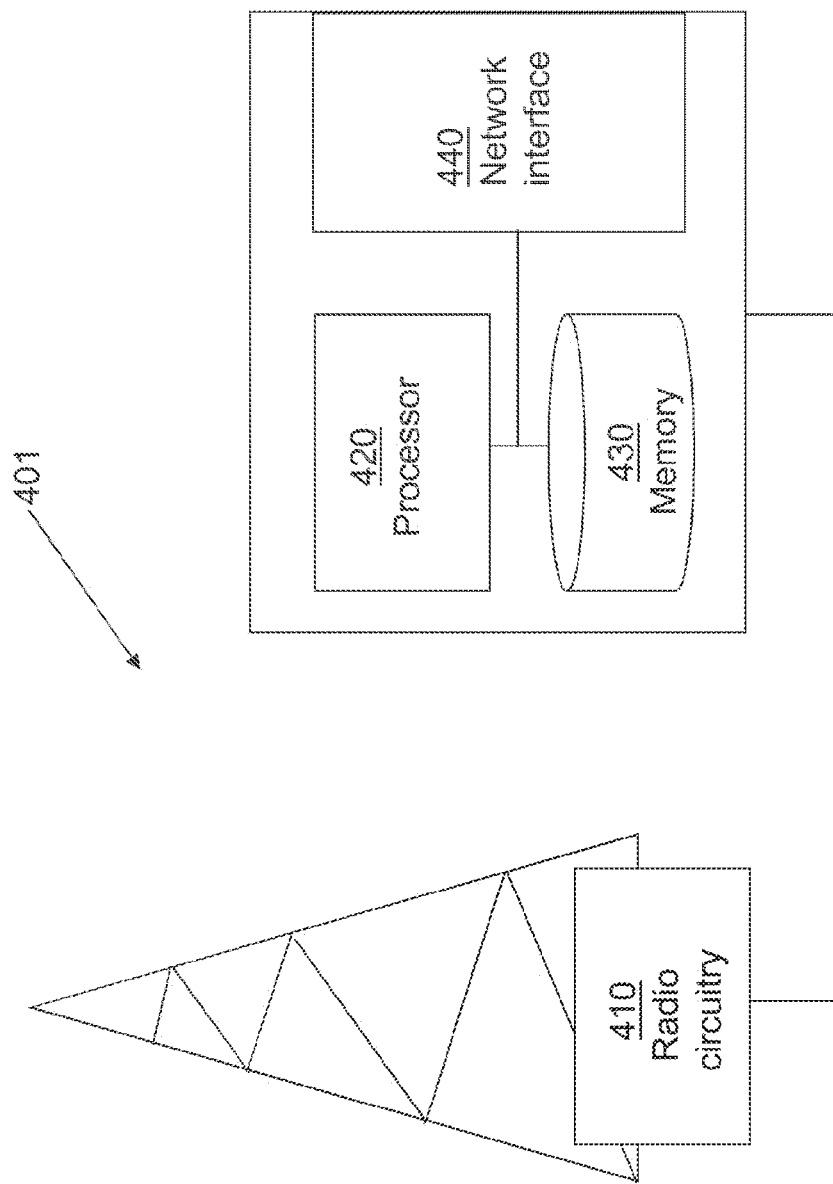
FIG. 16 is an illustrative example of an example base station configuration, according to some of the example embodiments.

FIG. 16 illustrates an example node configuration of a base station 401 which may perform some of the example embodiments described herein. The base station 401 may comprise radio circuitry or a communication port 410 that may be configured to receive and/or transmit communication data, instructions, and/or messages. It should be appreciated that the radio circuitry or communication port 410 may comprise any number of transceiving, receiving, and/or transmitting units or circuitry. It should further be appreciated that the radio circuitry or communication port 410 may be in the form of any input or output communications port known in the art. The radio circuitry or communication port 410 may comprise RF circuitry and baseband processing circuitry (not shown).

The base station 401 may also comprise a processing unit or circuitry 420 which may be configured to implement HARQ-ACK control timing as described herein. The processing circuitry 420 may be any suitable type of computation unit, for example, a microprocessor, digital signal processor (DSP), field programmable gate array (FPGA), or application specific integrated circuit (ASIC), or any other form of circuitry. The base station 401 may further comprise a memory unit or circuitry 430 which may be any suitable type of computer readable memory and may be of volatile and/or non-volatile type. The memory 430 may be configured to store received, transmitted, and/or measured data, device parameters, communication priorities, and/or executable program instructions, e.g., scheduling instructions. The memory 430 may also be configured to store any form of configuration tables as described herein.

Figure 17:
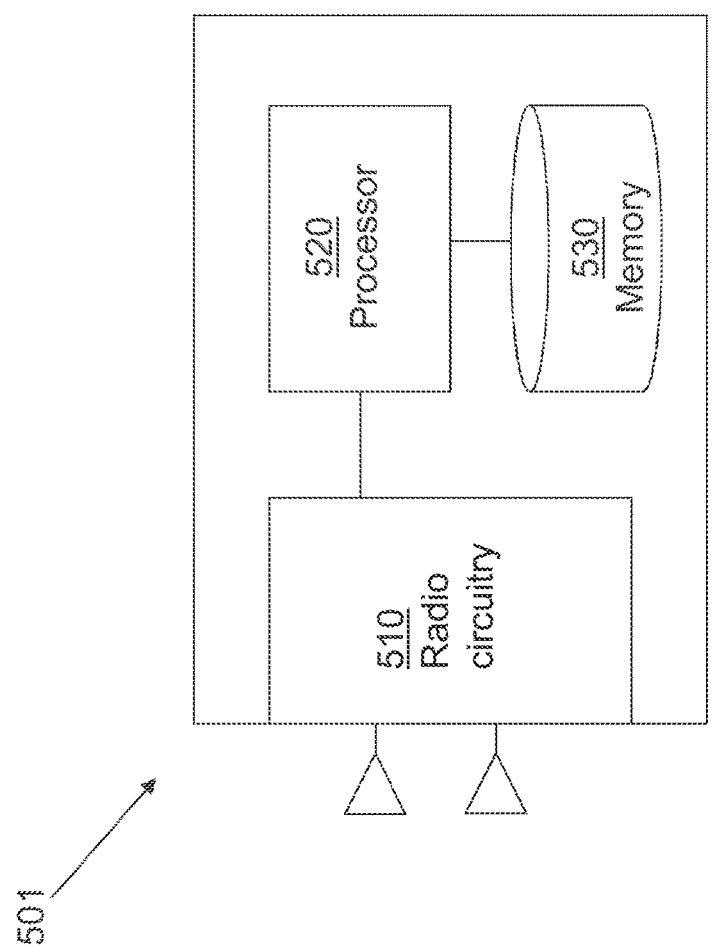
FIG. 17 is an illustrative example of a user equipment configuration, according to some of the example embodiments.

FIG. 17 illustrates an example node configuration of a user equipment 501 which may perform some of the example embodiments described herein. The user equipment 501 may comprise radio circuitry or a communication port 510 that may be configured to receive and/or transmit communication data, instructions, and/or messages. It should be appreciated that the radio circuitry or communication port 510 may comprise any number of transceiving, receiving, and/or transmitting units or circuitry. It should further be appreciated that the radio circuitry or communication port 510 may be in the form of any input or output communications port known in the art. The radio circuitry or communication port 510 may comprise RF circuitry and baseband processing circuitry (not shown).

The user equipment 501 may also comprise a processing unit or circuitry 520 which may be configured to implement HARQ-ACK control timing, as described herein. The processing circuitry 520 may be any suitable type of computation unit, for example, a microprocessor, digital signal processor (DSP), field programmable gate array (FPGA), or application specific integrated circuit (ASIC), or any other form of circuitry. The user equipment 501 may further comprise a memory unit or circuitry 530 which may be any suitable type of computer readable memory and may be of volatile and/or non-volatile type. The memory 530 may be configured to store received, transmitted, and/or measured data, device parameters, communication priorities, and/or executable program instructions, e.g., scheduling instructions. The memory 530 may also be configured to store any form of configuration tables as described herein.

Example Node Operations

Figure 18:
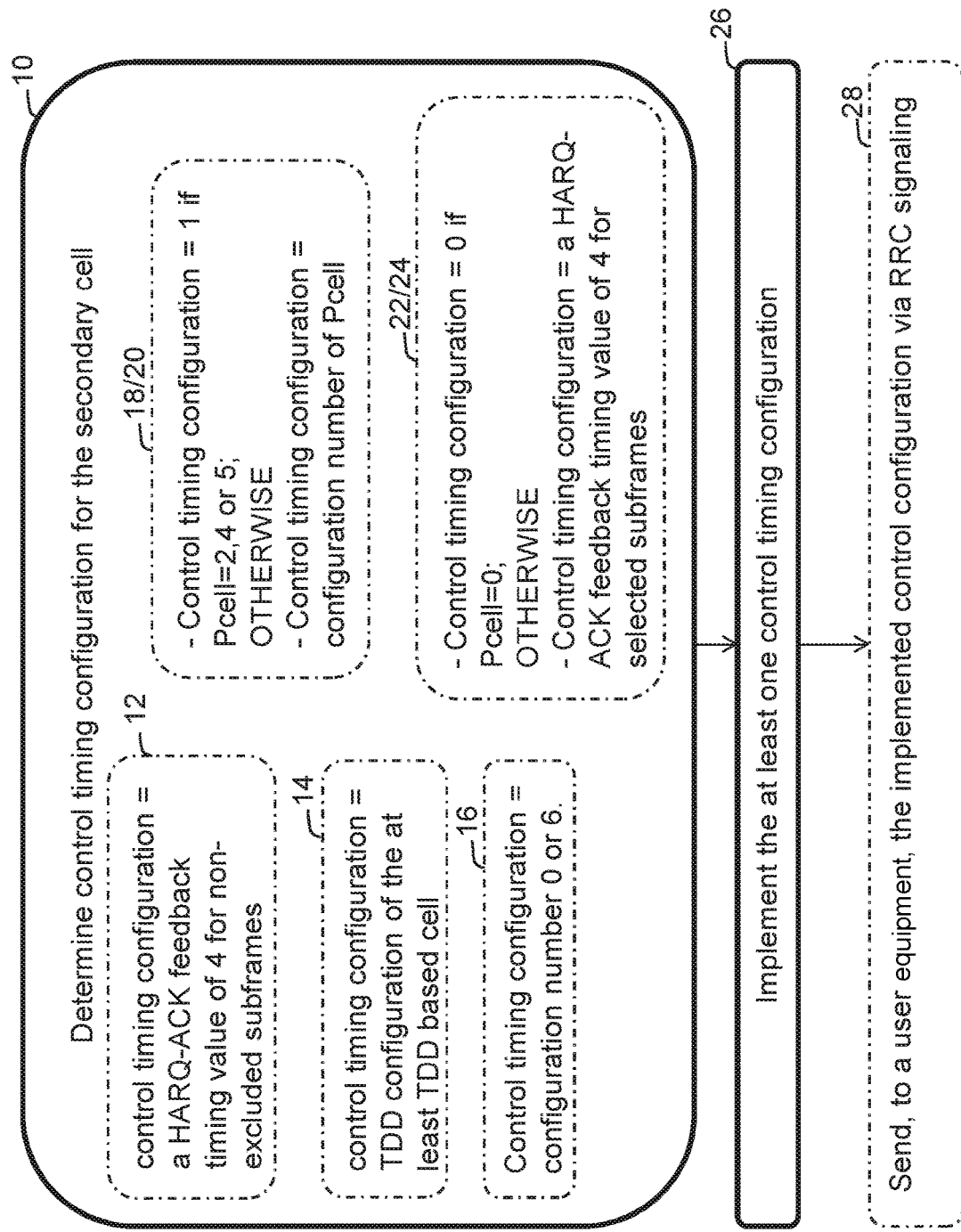
FIG. 18 is a flow diagram depicting example operations which may be taken by the base station of FIG. 16, according to some of the example embodiments.

FIG. 18 is a flow diagram depicting example operations which may be performed by the base station 401 as described herein to implement HARQ-ACK control timing, as described herein. It should be appreciated that FIG. 18 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be performed in addition to the operations of the broader example embodiments. It should be appreciated that these operations need not be performed in order. Furthermore, it should be appreciated that not all of the operations need to be performed. The example operations may be performed in any order and in any combination.

The example operations of FIG. 18 describe a base station, and corresponding method, for determining a control timing configuration. The control timing configuration provides a subframe timing setting for configuration PUSCH and uplink HARQ-ACK control timing for a cell serving a user equipment in a multiple cell communications network. The user equipment is served by a TDD based cell and a FDD based cell.

Operation 10

The base station 401 is configured to determine a control timing configuration for a secondary cell. The secondary cell is one of the TDD based cell or the FDD based cell. The determination of the control timing configuration is based on a type of the scheduling cell. The type of the scheduling cell is either FDD or TDD. The processing circuitry 420 is configured to determine the control timing configuration for the secondary cell.

Example Operation 12

According to some of the example embodiments, the determining 10 may further comprise determining 12 the control timing configuration to comprise a transmission timing value of 4 for all subframes for a PUSCH, where downlink subframes of the scheduling cell which map to downlink subframes of the secondary cell are excluded from PUSCH timing. The processing circuitry 420 is configured to determine the control timing configuration to comprise a transmission timing value of 4 for all subframes for a PUSCH, where downlink subframes of the scheduling cell which map to downlink subframes of the secondary cell are excluded from PUSCH timing.

According to some of the example embodiments, in example operation 12, the secondary cell may be either the FDD based cell or the TDD based cell. Furthermore, the scheduling cell may be the TDD based cell or the FDD based cell.

An example of operation 12 is provided under at least the heading "The FDD based cell as the scheduling cell" and subheading "Scheduled SCell follows FDD timing", as well as FIG. 5. As shown in FIG. 5, the TDD based SCell follows FDD timing, specifically, a timing value of 4 is utilized for all subframes for a PUSCH.

A further example of operation 12 is provided under the heading "The TDD based cell as the scheduling cell" and subheading "Scheduled SCell follows FDD timing", as well as FIGS. 9 and 10. As illustrated in FIGS. 9 and 10, the FDD based SCell follows its own timing, specifically, a timing value of 4 is utilized for all subframes for a PUSCH.

Example Operation 14

According to some of the example embodiments, the determining 10 may further comprise determining 14 the control timing configuration to be equivalent to a TDD configuration of the TDD based cell. The processing circuitry 420 is configured to determine the control timing configuration to be equivalent to a TDD configuration of the TDD based cell.

According to some of the example embodiments, in example operation 14, the secondary cell may be either the FDD based cell or the TDD based cell. Furthermore, the scheduling cell may be the TDD based cell or the FDD based cell.

An example of operation 14 is provided under at least the heading "The FDD based cell as the scheduling cell" and subheading "Scheduled SCell follows TDD timing", as well as FIG. 6. As illustrated in FIG. 6, a TDD based SCell follows its own configuration. Thus, in the example provided in FIG. 6, the TDD based SCell follows control timing according to configuration 1, which is the configuration of the TDD based SCell.

A further example of operation 14 is provided under at least the heading "The TDD based cell as the scheduling cell" and subheading "Scheduled SCell follows TDD timing", as well as FIGS. 7 and 8. As shown in FIG. 7, the FDD based SCell follows the control timing according to the configuration of the TDD based PCell, which functions as the scheduling cell. Specifically, the FDD based SCell follows the control timing according to configuration 1, which is the configuration of the TDD based PCell. Similarly, in FIG. 8, the FDD based SCell follows control timing according to configuration 2, which is the configuration of the scheduling TDD based PCell.

Example Operation 16

According to some of the example embodiments, the secondary cell is the FDD based cell and the scheduling cell is the TDD based cell. According to such example embodiments, the determining 10 further comprises determining 16 the control timing configuration to be equivalent to a configuration number of 0 or 6. The processing circuitry 420 is configured to determine the control timing configuration to be equivalent to a configuration number of 0 or 6.

Example operation 16 is further described under at least the heading "The TDD based cell as the scheduling cell" and the subheading "Scheduled SCell follows timing according to subframe hierarchy" and FIGS. 12 and 13. According to some of the example embodiments, scheduling based on a subframe hierarchy provides that either a configuration of 0 or 6 is chosen for scheduling the FDD based SCell. It should be appreciated that the choice of a configuration number of 0 or 6 is provided with respect to a subframe hierarchy as explained in FIG. 11.

As shown in FIG. 12, a FDD based SCell, functioning as the scheduled cell, is aggregated with a TDD based PCell with a configuration of 1, functioning as the scheduling cell. In the example provided in FIG. 12, the FDD based SCell is scheduled with a configuration of 0 as provided by the subframe hierarchy of FIG. 11.

FIG. 13 illustrates a FDD based SCell, functioning as the scheduled cell, is aggregated with a TDD based PCell with a configuration of 2, functioning as the scheduling cell. In the example provided in FIG. 13, the FDD based SCell is scheduled with a configuration of 0 as provided by the subframe hierarchy of FIG. 11.

Example Operation 18

According to some of the example embodiments, the scheduling cell is the TDD based cell and the secondary cell is the FDD based cell. According to such example embodiments, the determining 10 may further comprise determining 18 the control timing configuration to be configuration number 1 if a configuration number of the scheduling cell is 2, 4 or 5. The processing circuitry 420 is configure to determine the control timing configuration to be configuration number 1 if a configuration number of the scheduling cell is 2, 4 or 5.

Example operation 18 is further described under at least the heading "The TDD based cell as the scheduling cell" and subheading "FDD SCell scheduling based on revised tables" as well as tables 5-8. As illustrated in tables 5-8, for configurations 2, 4 and 5, the k values of configuration 1 have been provided from tables 1-4, respectively. All other configurations of tables 5-8 comprise the normal configurations as provided in tables 1-4, respectively. Thus, tables 5-8 are revised tables.

Example Operation 20

According to some of the example embodiments, the operation of determining 10 and the example operation of determining 18 may further comprise, if the configuration number of the scheduling cell is not 2, 4 or 5, determining 20 the control timing configuration to be equivalent to the configuration number of the scheduling cell. The processing circuitry 420 is configured to determine the control timing configuration to be equivalent to the configuration number of the scheduling cell.

Example operation 20 is further described under at least the heading "The TDD based cell as the scheduling cell" and subheading "FDD SCell scheduling based on revised tables" as well as tables 5-8. As illustrated in tables 5-8, for configurations 2, 4 and 5, the k values of configuration 1 have been provided from tables 1-4, respectively. All other configurations of tables 5-8 comprise the normal configurations as provided in tables 1-4, respectively. Thus, tables 5-8 are revised tables.

Example Operation 22

According to some of the example embodiments the scheduling cell is the TDD based cell and the secondary cell is the FDD based cell. According to such example embodiments, the HARQ-ACK is transmitted on the secondary cell. Accordingly, the determining 10 may further comprise determining 22 the control timing configuration to be configuration number 0 if the configuration of the scheduling cell is 0. The processing circuitry 420 is configured determine the control timing configuration to be configuration number 0 if the configuration of the scheduling cell is 0.

Example operation 22 is further described under at least the heading "The TDD based cell as the scheduling cell" and subheading "Cases where the PHICH is transmitted on the scheduled FDD cell" as well as tables 9-12. As illustrated in tables 9-12, for configuration 0, the k values of configuration 0 have been provided from tables 1-4, respectively. All other configurations of tables 9-12 comprise FDD timing values, specifically a timing value of 4 for all subframes for a PUSCH. It should be appreciated that the tables for configurations 1-6 are constructed in order to exclude downlink subframes of the FDD based cell to map to uplink subframes of the TDD based PCell (e.g., the scheduling cell). Thus, tables 9-12 are revised tables.

Example Operation 24

According to some of the example embodiments, the operation of determining 10 and the example operation of determining 22 further comprise, if the configuration number of the scheduling cell is not 0, determining 24 the control timing configuration to be a HARQ-ACK feedback timing value of 4 for a subframe in which a corresponding TDD subframe, for a same configuration number, is a downlink subframe. The processing circuitry 420 is configured to determine the control timing configuration to be a HARQ-ACK feedback timing value of 4 for a subframe in which a corresponding TDD subframe, for a same configuration number, is a downlink subframe.

Example operation 24 is further described under at least the heading "The TDD based cell as the scheduling cell" and subheading "Cases where the PHICH is transmitted on the scheduled FDD cell" as well as tables 9-12. As illustrated in tables 9-12, for configuration 0, the k values of configuration 0 have been provided from tables 1-4, respectively. All other configurations of tables 9-12 comprise FDD timing values, specifically a timing value of 4 for all subframes for a PUSCH. It should be appreciated that the tables for configurations 1-6 are constructed in order to exclude downlink subframes of the FDD based cell to map to uplink subframes of the TDD based PCell (e.g., the scheduling cell). Thus, tables 9-12 are revised tables.

Operation 26

The base station is further configured to implement the control timing configuration for PUSCH and uplink HARQ-ACK control timing for a cell serving the user equipment. The processing circuitry 420 is configured to implement the control timing configuration for PUSCH and uplink HARQ-ACK control timing for a cell serving the user equipment.

Example Operation 28

According to some of the example embodiments, the base station may be further configured to send, to the user equipment, the implemented control timing configuration via RRC signalling. The radio circuitry 410 is configured to send, to the user equipment, the implement control timing configuration via RRC signalling.

Figure 19:
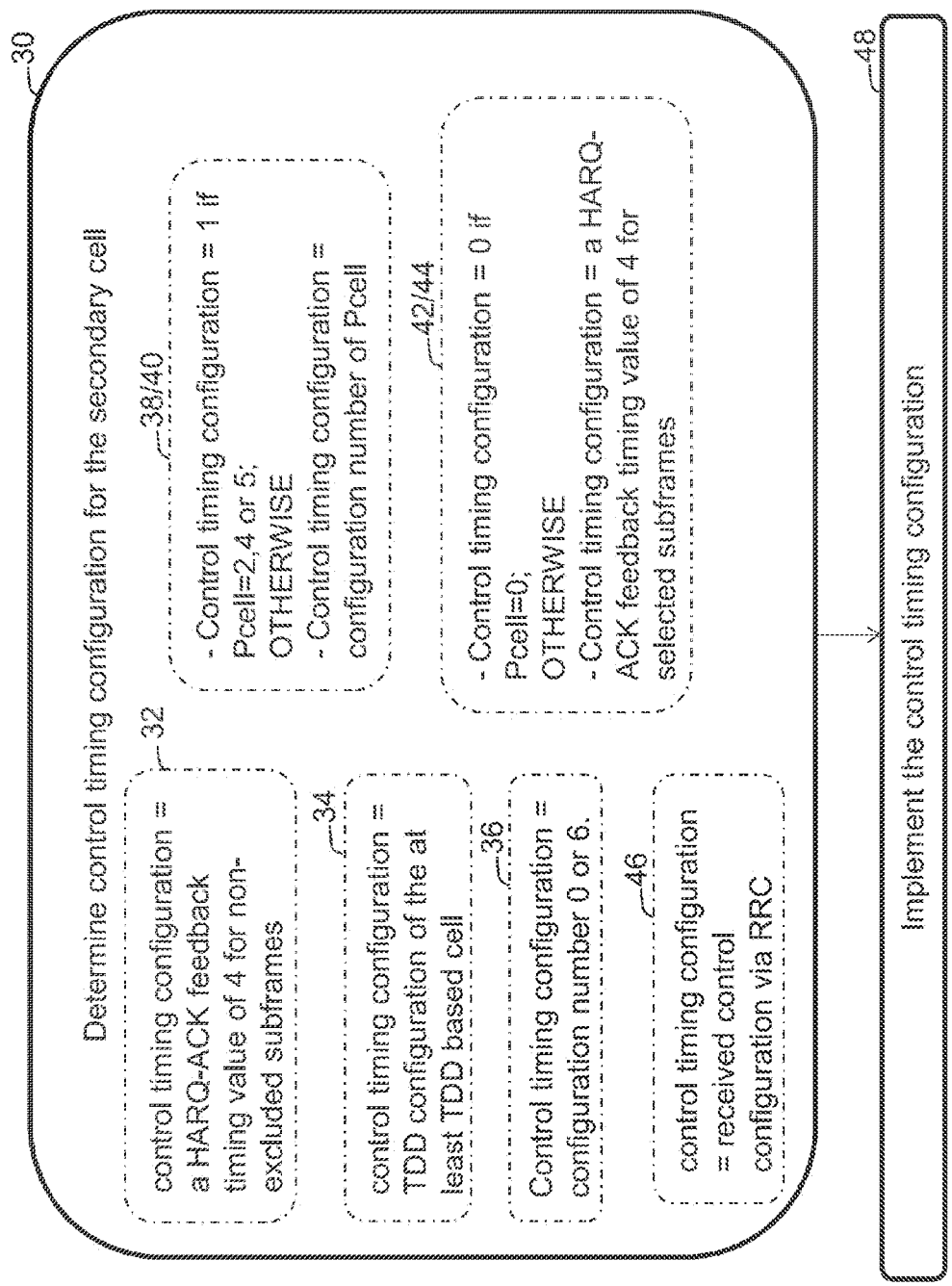
FIG. 19 is a flow diagram depicting example operations which may be taken by the user equipment of FIG. 17, according to some of the example embodiments.

FIG. 19 is a flow diagram depicting example operations which may be performed by the user equipment 501 as described herein to implement HARQ-ACK control timing, as described herein. It should be appreciated that FIG. 19 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be performed in addition to the operations of the broader example embodiments. It should be appreciated that these operations need not be performed in order. Furthermore, it should be appreciated that not all of the operations need to be performed. The example operations may be performed in any order and in any combination.

The example operations of FIG. 19 describe a user equipment, and corresponding method, for determining a control timing configuration. The control timing configuration provides a subframe timing setting for configuration PUSCH and uplink HARQ-ACK control timing for a cell serving a user equipment in a multiple cell communications network. The user equipment is served by a TDD based cell and a FDD based cell.

Operation 30

The user equipment 501 is configured to determine a control timing configuration for a secondary cell. The secondary cell is one of the TDD based cell or the FDD based cell. The determination of the control timing configuration is based on a type of the scheduling cell. The type of the scheduling cell is either FDD or TDD. The processing circuitry 520 is configured to determine the control timing configuration for the secondary cell.

Example Operation 32

According to some of the example embodiments, the determining 30 may further comprise determining 32 the control timing configuration to comprise a transmission timing value of 4 for all subframes for a PUSCH, where downlink subframes of the scheduling cell which map to downlink subframes of the secondary cell are excluded form PUSCH timing. The processing circuitry 520 is configured to determine the control timing configuration to comprise a transmission timing value of 4 for all subframes for a PUSCH, where downlink subframes of the scheduling cell which map to downlink subframes of the secondary cell are excluded from PUSCH timing.

According to some of the example embodiments, according to example operation 32, the secondary cell may be either the FDD based cell or the TDD based cell. Furthermore, the scheduling cell may be the TDD based cell or the FDD based cell.

An example of operation 32 is provided under at least the heading "The FDD based cell as the scheduling cell" and subheading "Scheduled SCell follows FDD timing", as well as FIG. 5. As shown in FIG. 5, the TDD based SCell follows FDD timing, specifically, a timing value of 4 is utilized for all subframes for a PUSCH.

A further example of operation 32 is provided under the heading "The TDD based cell as the scheduling cell" and subheading "Scheduled SCell follows FDD timing", as well as FIGS. 9 and 10. As illustrated in FIGS. 9 and 10, the FDD based SCell follows its own timing, specifically, a timing value of 4 is utilized for all subframes for a PUSCH.

Example Operation 34

According to some of the example embodiments, the determining 30 may further comprise determining 34 the control timing configuration to be equivalent to a TDD configuration of the TDD based cell. The processing circuitry 520 is configured to determine the control timing configuration to be equivalent to a TDD configuration of the TDD based cell.

According to some of the example embodiments, according to example operation 34, the secondary cell may be either the FDD based cell or the TDD based cell. Furthermore, the scheduling cell may be the TDD based cell or the FDD based cell.

An example of operation 34 is provided under at least the heading "The FDD based cell as the scheduling cell" and subheading "Scheduled SCell follows TDD timing", as well as FIG. 6. As illustrated in FIG. 6, a TDD based SCell follows its own configuration. Thus, in the example provided in FIG. 6, the TDD based SCell follows control timing according to configuration 1, which is the configuration of the TDD based SCell.

A further example of operation 34 is provided under at least the heading "The TDD based cell as the scheduling cell" and subheading "Scheduled SCell follows TDD timing", as well as FIGS. 7 and 8. As shown in FIG. 7, the FDD based SCell follows the control timing according to the configuration of the TDD based PCell, which functions as the scheduling cell. Specifically, the FDD based SCell follows the control timing according to configuration 1, which is the configuration of the TDD based PCell. Similarly, in FIG. 8, the FDD based SCell follows control timing according to configuration 2, which is the configuration of the scheduling TDD based PCell.

Example Operation 36

According to some of the example embodiments, the secondary cell is the FDD based cell and the scheduling cell is the TDD based cell. According to such example embodiments, the determining 30 further comprises determining 36 the control timing configuration to be equivalent to a configuration number of 0 or 6. The processing circuitry 520 is configured to determine the control timing configuration to be equivalent to a configuration number of 0 or 6.

Example operation 36 is further described under at least the heading "The TDD based cell as the scheduling cell" and the subheading "Scheduled SCell follows timing according to subframe hierarchy" and FIGS. 12 and 13. According to some of the example embodiments, scheduling based on a subframe hierarchy provides that either a configuration of 0 or 6 is chosen for scheduling the FDD based SCell. It should be appreciated that the choice of a configuration number of 0 or 6 is provided with respect to a subframe hierarchy as explained in FIG. 11.

As shown in FIG. 12, a FDD based SCell, functioning as the scheduled cell, is aggregated with a TDD based PCell with a configuration of 1, functioning as the scheduling cell. In the example provided in FIG. 12, the FDD based SCell is scheduled with a configuration of 0 as provided by the subframe hierarchy of FIG. 11.

FIG. 13 illustrates a FDD based SCell, functioning as the scheduled cell, is aggregated with a TDD based PCell with a configuration of 2, functioning as the scheduling cell. In the example provided in FIG. 13, the FDD based SCell is scheduled with a configuration of 0 as provided by the subframe hierarchy of FIG. 11.

Example Operation 38

According to some of the example embodiments, the scheduling cell is the TDD based cell and the secondary cell is the FDD based cell. According to such example embodiments, the determining 30 may further comprise determining 38 the control timing configuration to be configuration number 1 if a configuration number of the scheduling cell is 2, 4 or 5. The processing circuitry 520 is configured to determine the control timing configuration to be configuration number 1 if a configuration number of the scheduling cell is 2, 4 or 5.

Example operation 38 is further described under at least the heading "The TDD based cell as the scheduling cell" and subheading "FDD SCell scheduling based on revised tables" as well as tables 5-8. As illustrated in tables 5-8, for configurations 2, 4 and 5, the k values of configuration 1 have been provided from tables 1-4, respectively. All other configurations of tables 5-8 comprise the normal configurations as provided in tables 1-4, respectively. Thus, tables 5-8 are revised tables.

Example Operation 40

According to some of the example embodiments, the operation of determining 30 and the example operation of determining 38 may further comprise, if the configuration number of the scheduling cell is not 2, 4 or 5, determining 40 the control timing configuration to be equivalent to the configuration number of the scheduling cell. The processing circuitry 520 is configured to determine the control timing configuration to be equivalent to the configuration number of the scheduling cell.

Example operation 40 is further described under at least the heading "The TDD based cell as the scheduling cell" and subheading "FDD SCell scheduling based on revised tables" as well as tables 5-8. As illustrated in tables 5-8, for configurations 2, 4 and 5, the k values of configuration 1 have been provided from tables 1-4, respectively. All other configurations of tables 5-8 comprise the normal configurations as provided in tables 1-4, respectively. Thus, tables 5-8 are revised tables.

Example Operation 42

According to some of the example embodiments the scheduling cell is the TDD based cell and the secondary cell is the FDD based cell. According to such example embodiments, the HARQ-ACK is transmitted on the secondary cell. Accordingly, the determining 30 may further comprise determining 42 the control timing configuration to be configuration number 0 if the configuration of the scheduling cell is 0. The processing circuitry 520 is configured determine the control timing configuration to be configuration number 0 if the configuration of the scheduling cell is 0.

Example operation 42 is further described under at least the heading "The TDD based cell as the scheduling cell" and subheading "Cases where the PHICH is transmitted on the scheduled FDD cell" as well as tables 9-12. As illustrated in tables 9-12, for configuration 0, the k values of configuration 0 have been provided from tables 1-4, respectively. All other configurations of tables 9-12 comprise FDD timing values, specifically a timing value of 4 for all subframes for a PUSCH. It should be appreciated that the tables for configurations 1-6 are constructed in order to exclude downlink subframes of the FDD based cell to map to uplink subframes of the TDD based PCell (e.g., the scheduling cell). Thus, tables 9-12 are revised tables.

Example Operation 44

According to some of the example embodiments, the operation of determining 30 and the example operation of determining 42 further comprise, if the configuration number of the scheduling cell is not 0, determining 44 the control timing configuration to be a HARQ-ACK feedback timing value of 4 for a subframe in which a corresponding TDD subframe, for a same configuration number, is a downlink subframe. The processing circuitry 520 is configured to determine the control timing configuration to be a HARQ-ACK feedback timing value of 4 for a subframe in which a corresponding TDD subframe, for a same configuration number, is a downlink subframe.

Example operation 44 is further described under at least the heading "The TDD based cell as the scheduling cell" and subheading "Cases where the PHICH is transmitted on the scheduled FDD cell" as well as tables 9-12. As illustrated in tables 9-12, for configuration 0, the k values of configuration 0 have been provided from tables 1-4, respectively. All other configurations of tables 9-12 comprise FDD timing values, specifically a timing value of 4 for all subframes for a PUSCH. It should be appreciated that the tables for configurations 1-6 are constructed in order to exclude downlink subframes of the FDD based cell to map to uplink subframes of the TDD based PCell (e.g., the scheduling cell). Thus, tables 9-12 are revised tables.

Example Operation 46

According to some of the example embodiments, the determining 30 may further comprise receiving, from the base station, the control timing configuration via RRC signalling. The radio circuitry 510 is configured to receive, from the base station, the control timing configuration via RRC signalling.

Operation 48

The user equipment is further configured to implement 48 the control timing configuration for PUSCH and uplink HARQ-ACK control timing for a cell serving the user equipment. The processing circuitry 520 is configured to implement the control timing configuration for PUSCH and uplink HARQ-ACK control timing for a cell serving the user equipment.

It should be noted that although terminology from 3GPP LTE has been used herein to explain the example embodiments, this should not be seen as limiting the scope of the example embodiments to only the aforementioned system. Other wireless systems, comprising HSPA, WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatuses, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A wireless terminal or user equipment (UE) as the term is used herein, is to be broadly interpreted to comprise a radiotelephone having ability for Internet/intranet access, web browser, organizer, calendar, a camera, e.g., video and/or still image camera, a sound recorder, e.g., a microphone, and/or global positioning system (GPS) receiver; a personal communications system (PCS) user equipment that may combine a cellular radiotelephone with data processing; a personal digital assistant (PDA) that can comprise a radiotelephone or wireless communication system; a laptop; a camera, e.g., video and/or still image camera, having communication ability; and any other computation or communication device capable of transceiving, such as a personal computer, a home entertainment system, a television, etc. It should be appreciated that the term user equipment may also comprise any number of connected devices, wireless terminals or machine-to-machine devices.

It should further be appreciated that the term dual connectivity should not be limited to a user equipment or wireless terminal being connected to only two base stations. In dual connectivity a wireless terminal may be connected to any number of base stations.

The various example embodiments described herein are described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method, in a base station, for determining a control timing configuration, the control timing configuration providing a subframe timing setting for configuring a Physical Uplink Shared Channel, PUSCH, and a corresponding uplink Hybrid Automatic Repeat Request Acknowledgment, HARQ-ACK, control timing for a cell serving a user equipment in a multiple cell communications network, the user equipment being served by a Time Division Duplex, TDD, based cell, and a Frequency Division Duplex, FDD, based cell, the method comprising:
    determining the control timing configuration for a secondary cell based on a type of a scheduling cell, the secondary cell being the FDD based cell;
    implementing the control timing configuration for the PUSCH and the corresponding uplink HARQ-ACK control timing for the cell serving the user equipment; and
    if the cell serving the user equipment by being scheduled with the PUSCH is the FDD based cell and the type of the scheduling cell is the TDD based cell and HARQ-ACK is transmitted on the secondary cell, the determining further comprising:
        determining the control timing configuration to be configuration number 0 if a configuration number of the scheduling cell is 0; and
        if the configuration number of the scheduling cell is not 0, determining the control timing configuration to be a HARQ-ACK feedback timing value of 4 for a subframe in which a corresponding TDD subframe, for a same configuration number, is a downlink subframe.

2. A base station for determining a control timing configuration, the control timing configuration providing a subframe timing setting for configuring a Physical Uplink Shared Channel, PUSCH, and a corresponding uplink Hybrid Automatic Repeat Request Acknowledgment, HARQ-ACK, control timing for a cell serving a user equipment in a multiple cell communications network, the user equipment being served by a Time Division Duplex, TDD, based cell, and a Frequency Division Duplex, FDD, based cell, the base station comprising:
    processing circuitry configured to:
        determine the control timing configuration for a secondary cell based on a type of a scheduling cell, the secondary cell being the FDD based cell; and
        implement the control timing configuration for the PUSCH and the corresponding uplink HARQ-ACK control timing for the cell serving the user equipment; and
    if the cell serving the user equipment by being scheduled with the PUSCH is the FDD based cell and the type of the scheduling cell is the TDD based cell and HARQ-ACK is transmitted on the secondary cell, the determining further comprising:
        determining the control timing configuration to be configuration number 0 if a configuration number of the scheduling cell is 0; and
        if the configuration number of the scheduling cell is not 0, determining the control timing configuration to be a HARQ-ACK feedback timing value of 4 for a subframe in which a corresponding TDD subframe, for a same configuration number, is a downlink subframe.

3. A method, in a user equipment, for determining a control timing configuration, the control timing configuration providing a subframe timing setting for configuring a Physical Uplink Shared Channel, PUSCH, and a corresponding uplink Hybrid Automatic Retransmission Repeat Acknowledgment, HARQ-ACK, control timing for a cell serving the user equipment in a multiple cell communications network, the user equipment being served by a Time Division Duplex, TDD, based cell, and a Frequency Division Duplex, FDD, based cell, the method comprising:
    determining the control timing configuration for a secondary cell based on a type of a scheduling cell, the secondary cell being the FDD based cell; and
    implementing the control timing configuration for the PUSCH and the corresponding uplink HARQ-ACK control timing for the cell serving the user equipment; and
    if the cell serving the user equipment by being scheduled with the PUSCH is the FDD based cell and the type of the scheduling cell is the TDD based cell and HARQ-ACK is transmitted on the secondary cell, the determining further comprising:
        determining the control timing configuration to be configuration number 0 if a configuration number of the scheduling cell is 0; and
        if the configuration number of the scheduling cell is not 0, determining the control timing configuration to be a HARQ-ACK feedback timing value of 4 for a subframe in which a corresponding TDD subframe, for a same configuration number, is a downlink subframe.

4. A user equipment for determining a control timing configuration, the control timing configuration providing a subframe timing setting for configuring a Physical Uplink Shared Channel, PUSCH, and a corresponding uplink Hybrid Automatic Repeat Request Acknowledgment, HARQ-ACK, control timing for a cell serving the user equipment in a multiple cell communications network, the user equipment being served by a Time Division Duplex, TDD, based cell, and a Frequency Division Duplex, FDD, based cell, the user equipment comprising:
    processing circuitry configured to:
        determine the control timing configuration for a secondary cell based on a type of a scheduling cell, the secondary cell being the FDD based cell; and
        implement the control timing configuration for the PUSCH and the corresponding uplink HARQ-ACK control timing for the cell serving the user equipment; and
    if the cell serving the user equipment by being scheduled with the PUSCH the FDD based cell and the type of the scheduling cell is the TDD based cell and HARQ-ACK is transmitted on the secondary cell, the determining further comprising:
        determining the control timing configuration to be configuration number 0 if a configuration number of the scheduling cell is 0; and
        if the configuration number of the scheduling cell is not 0, determining the control timing configuration to be a HARQ-ACK feedback timing value of 4 for a subframe in which a corresponding TDD subframe, for a same configuration number, is a downlink subframe.

\* \* \* \* \*